United States Patent [19]

Nobumoto et al.

[11] Patent Number: 5,070,461

[45] Date of Patent: Dec. 3, 1991

[54] SLIP CONTROL SYSTEM FOR A VEHICLE

[75] Inventors: Kazutoshi Nobumoto; Toshiaki Tsuyama; Toru Onaka; Yutaka Tsukahara, all of Hiroshima, Japan

[73] Assignee: Mazda Motor Corporation, Hiroshima, Japan

[21] Appl. No.: 491,864

[22] Filed: Mar. 12, 1990

[30] Foreign Application Priority Data

Mar. 10, 1989 [JP] Japan .................................. 1-58140

[51] Int. Cl.[5] .............................................. B60T 8/32
[52] U.S. Cl. ................................ 364/426.03; 180/197; 303/103
[58] Field of Search ................... 180/197; 303/95, 100, 303/130, 103; 361/238; 364/426.02, 426.03

[56] References Cited

U.S. PATENT DOCUMENTS

| | | | |
|---|---|---|---|
| 4,583,611 | 4/1986 | Frank et al. | 180/197 |
| 4,763,262 | 8/1988 | Leiber | 364/426.03 |
| 4,866,623 | 9/1989 | Ise et al. | 364/426.03 |
| 4,866,624 | 9/1989 | Nishikawa et al. | 364/426.03 |
| 4,884,651 | 12/1989 | Harada et al. | 364/426.03 |
| 4,901,239 | 2/1990 | Yoshino | 364/426.02 |
| 4,921,064 | 5/1990 | Wazaki et al. | 180/197 |
| 4,942,950 | 7/1990 | Watanebe et al. | 364/426.03 |

Primary Examiner—Salvatore Cangialosi
Attorney, Agent, or Firm—Fish & Richardson

[57] ABSTRACT

A slip control system for a vehicle contains a first control unit for implementing feedback control of torque applied to the driven wheels so as to allow an actual slip value of the driven wheel to reach a predetermined target value. There are set a first judgment value larger than the target value and a second judgment value smaller than the first judgment value. A second control unit is provided for temporarily reducing the torque applied to the driven wheel by a predetermined decrement, in place of the feedback control, when the actual slip value reaches the first judgment value or larger than the first judgment value. There is further provided a third control unit for gradually reducing the torque applied to the driven wheel, in place of the feedback control, when the actual slip value of the driven wheel does not reach the second judgment value or a value smaller than the second judgment value even if a predetermined period of time elapses after start of control by the second control unit.

22 Claims, 17 Drawing Sheets

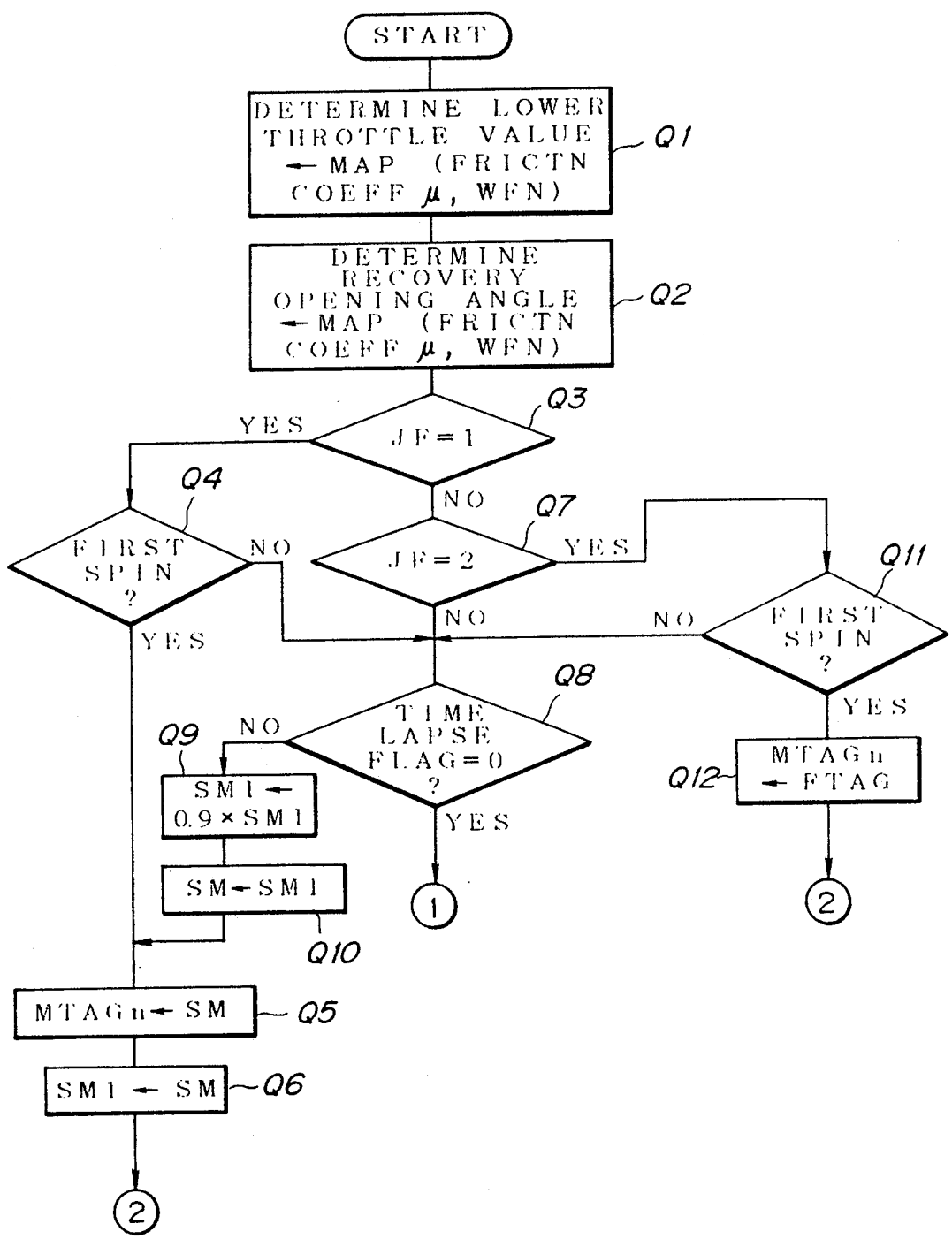

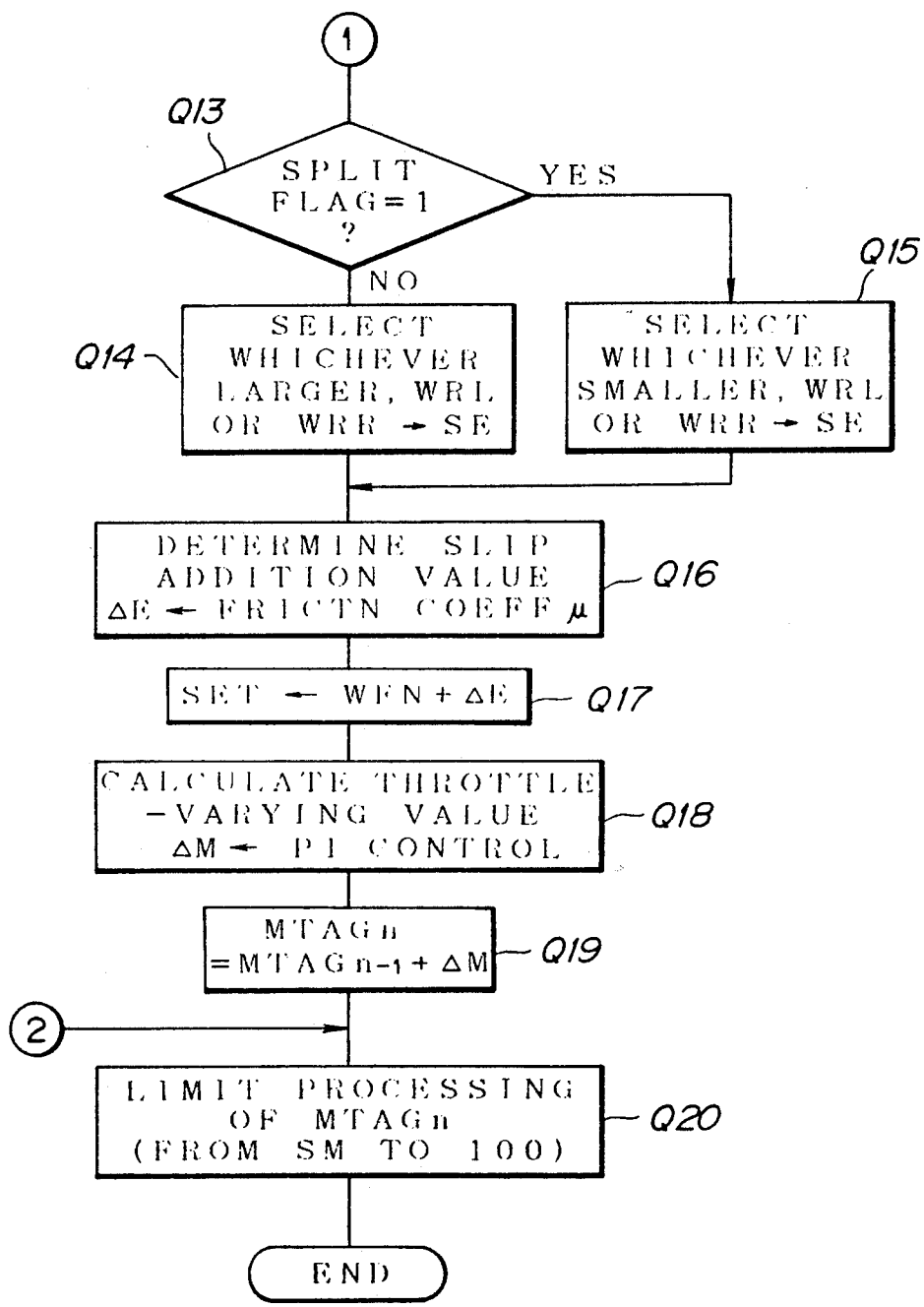

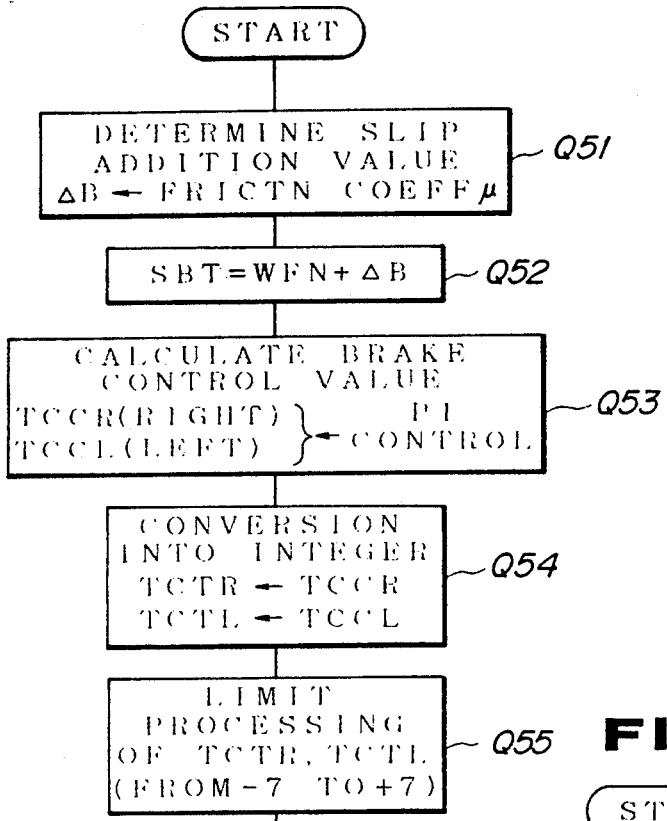
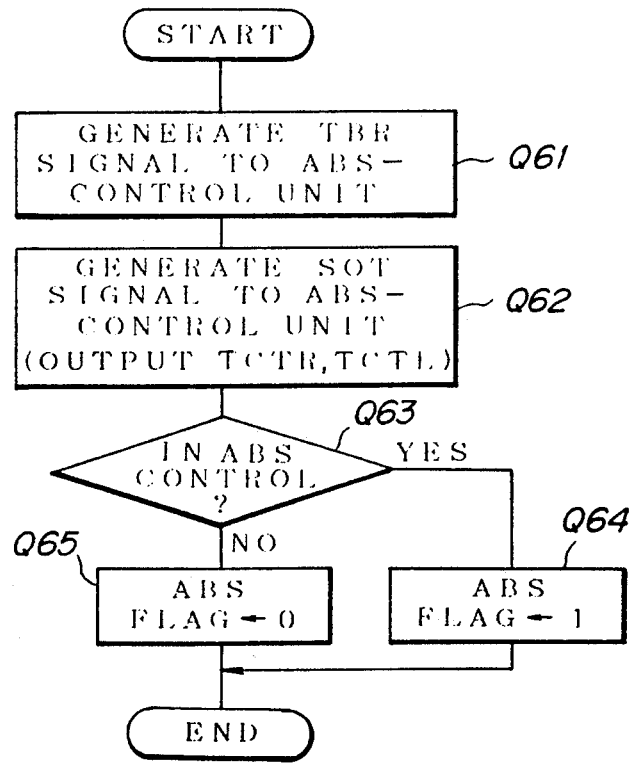

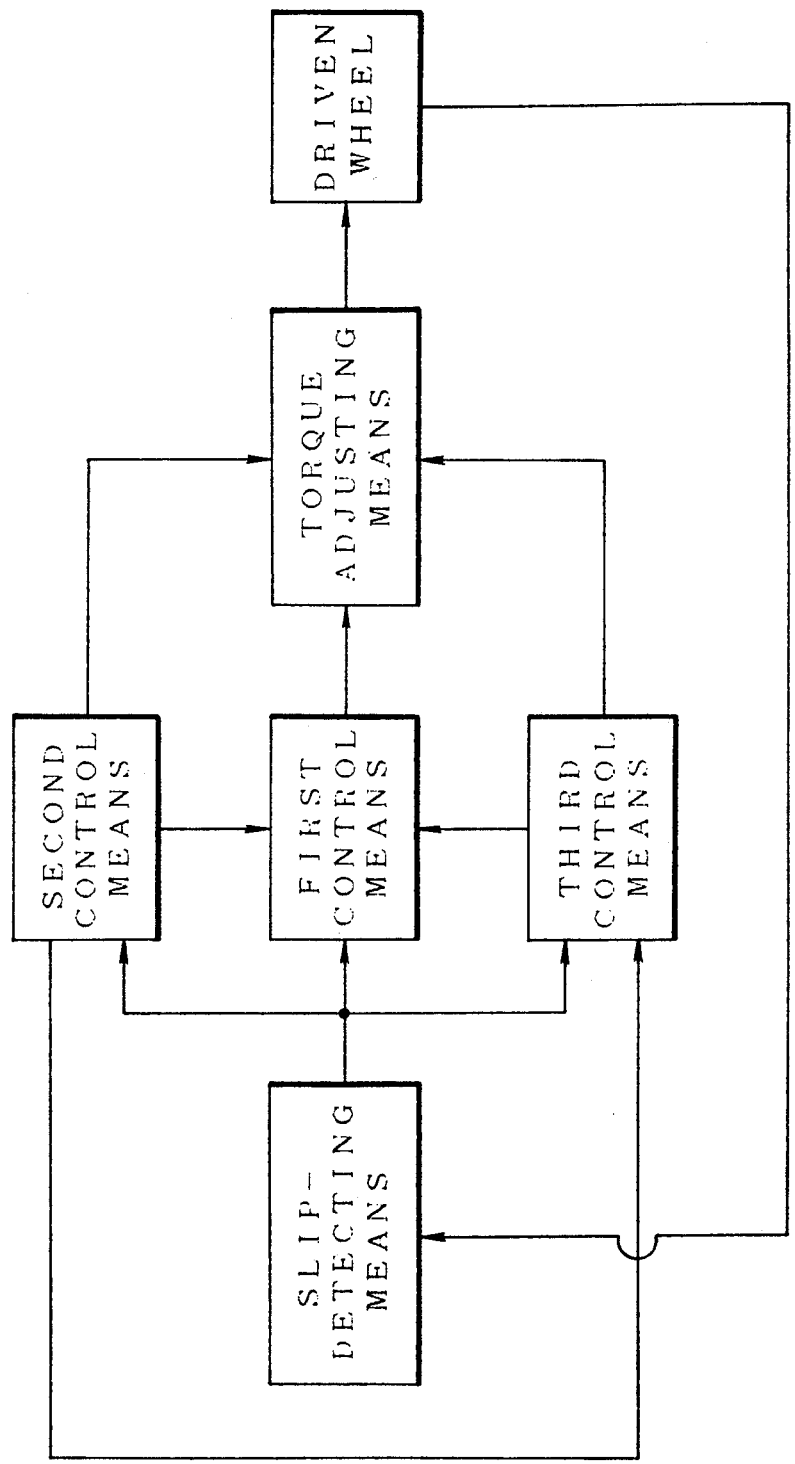

SLIP CONTROL SYSTEM FOR A VEHICLE

BACKGROUND OF THE INVENTION

1. Field of the Invention

The present invention relates to a slip control system for a vehicle and, more particularly, to a slip control system for the vehicle, adapted to prevent a slip of the driven wheels on a road surface from becoming excessive by controlling torque to be applied to the driven wheels.

2. Description of Related Art

Prevention of a slip of the driven wheels from becoming excessive is effective in order to efficiently provide a propulsive force of the vehicle as well as to provide safety in terms of prevention of a spin of the vehicle body and so on. In order to prevent an excessive amount of a slip of the driven wheels, torque to be applied to the driven wheels as a cause of slipping may be reduced.

Slip control of this type is disclosed, for example, in U.S. Pat. Nos. 4,484,280 and 4,583,611 (corresponding to Japanese Patent Unexamined Application (kokai) Nos. 16,948/1983 and 56,662/1985, respectively). T They disclose technique of reducing the torque applied to the driven wheels by braking the driven wheels by brakes as well as reducing the torque to be generated by the engine. More specifically, U.S. Pat. No. 4,484,280 (corresponding to Japanese Patent Unexamined Application (kokai) No. 16,948/1983) discloses the technique of reducing the torque to be applied to the driven wheels only by braking the driven wheels when a slip of the driven wheels is small and by reducing the torque generated by the engine, on top of braking the driven wheels, when a slip of the driven wheels becomes larger. U.S. Pat. No. 4,583,611 (corresponding to Japanese Patent Unexamined Publication (kokai) No. 56,662/1985) discloses the technique in which, when one of the left-hand and right-hand driven wheels is larger in slippage than the other, only the driven wheel having a larger slip value is braked and, when both of the driven wheels are larger in slippage, the two driven wheels are braked while the torque to be generated by the engine is reduced. In summary, the technique as disclosed in the two prior patent publications as described hereinabove uses the braking of the driven wheel or wheels by the brake or brakes as a main means and the reduction in the torque generated by the engine as an auxiliary means.

Japanese Patent Unexamined Publication (kokai) No. 31,869/1988 proposes that an excessive slip be reduced without delay by temporarily reducing torque applied to the driven wheels by a predetermined decrement when the slip value of the driven wheels becomes larger than a given judgment value larger than a predetermined target value on condition that feedback control is implemented in order to make the slip value of the driven wheels the predetermined target value. It has been found, however, likely to cause the problem that implementation of the feedback control toward the target value and a temporary reduction of the torque applied by the given decrement when exceeding the given judgment value may cause the torque applied to the driven wheels to be reduced to an extent that is more than necessary, thus impairing an acceleration feeling.

More specifically, when the feedback control is implemented so as to cause the slip value of the driven wheels to reach the target value, a control gain should be made small if a stable control is taken into account. Thus, if the control gain would be made small, the problem may arise as to responsiveness of control. This point can be offset by temporarily reducing the torque by a given decrement when the slip value exceeds the predetermined judgment value. In this case, however, there may often arise occasions where a temporary reduction in the torque applied becomes to great and, even if the feedback control would be implemented to reach the target value from the state in which the torque applied is reduced too much, a return to the target value requires a longer time period and this may result in worsening of the acceleration feeling.

If a temporarily reduced amount of the torque is made small in order to prevent the acceleration feeling from worsening, this may cause the problem in terms of rapid convergence of a slip.

SUMMARY OF THE INVENTION

Therefore, the present invention has the object to provide a slip control system for a vehicle, which can satisfy both acceleration and convergence of the slip with high reliability, by subjecting the slip value of the driven wheel to feedback control to reach a predetermined target value and by temporarily reducing the torque applied to the driven wheels by a predetermined decrement when the slip value of the driven wheels becomes larger than a predetermined judgment value set as a value larger than the above target value.

In order to achieve the object, the present invention consists of a slip control system for a vehicle, comprising a torque adjusting means for adjusting torque to be applied to a driven wheel; a slip-value detecting means for detecting a slip value of the driven wheel on a road surface; a first control means for subjecting the torque adjusting means to feedback control so as to allow the slip value of the driven wheel to reach a predetermined target value in response to output from the slip-value detecting means; a second control means for reducing the torque to be applied to the driven wheel temporarily by a predetermined decrement by controlling the torque adjusting means prior to the first control means when the slip value detected by the slip-value detecting means reaches a first judgment value set as a value greater than the predetermined target value; and a third control means for reducing the torque to be applied to the driven wheel gradually by controlling the torque adjusting means prior to the first control means when the slip value detected by the slip-value detecting means does not reach a second judgment value set as a value smaller than the first judgment value even if a predetermined period of time elapses after start of control by the second control means.

The arrangement for the slip control system prevents a situation that the torque applied becomes too low by making comparably small a decrement of the torque to be reduced by the second control means, as well as it ensures a sufficient level of acceleration.

If the slip is not converged because of an insufficient decrement of the torque to be decreased by the second control means, namely, if the slip value is not made smaller than the second judgment value within a predetermined time period, the torque is gradually decreased by the third control means so that the slip can be converged within short. It is to be noted herein, however, that if the slip control would be performed by the first control means, in place of the third control means, after the predetermined time period has elapsed, a longer time period is required for converging the slip on account of restrictions upon responsiveness.

Other objects, features and advantages of the present invention will become apparent in the course of the description of the preferred embodiments, which follows, with reference to the accompanying drawings.

BRIEF DESCRIPTION OF THE DRAWINGS

FIGS. 8-17 are flowcharts showing control examples in accordance with the present invention.

FIG. 20 is a block diagram showing an overall outline of the construction of the present invention.

DETAILED DESCRIPTION OF THE PREFERRED EMBODIMENTS

The present invention will be described in more detail with reference to the accompanying drawings.

Figure 1:
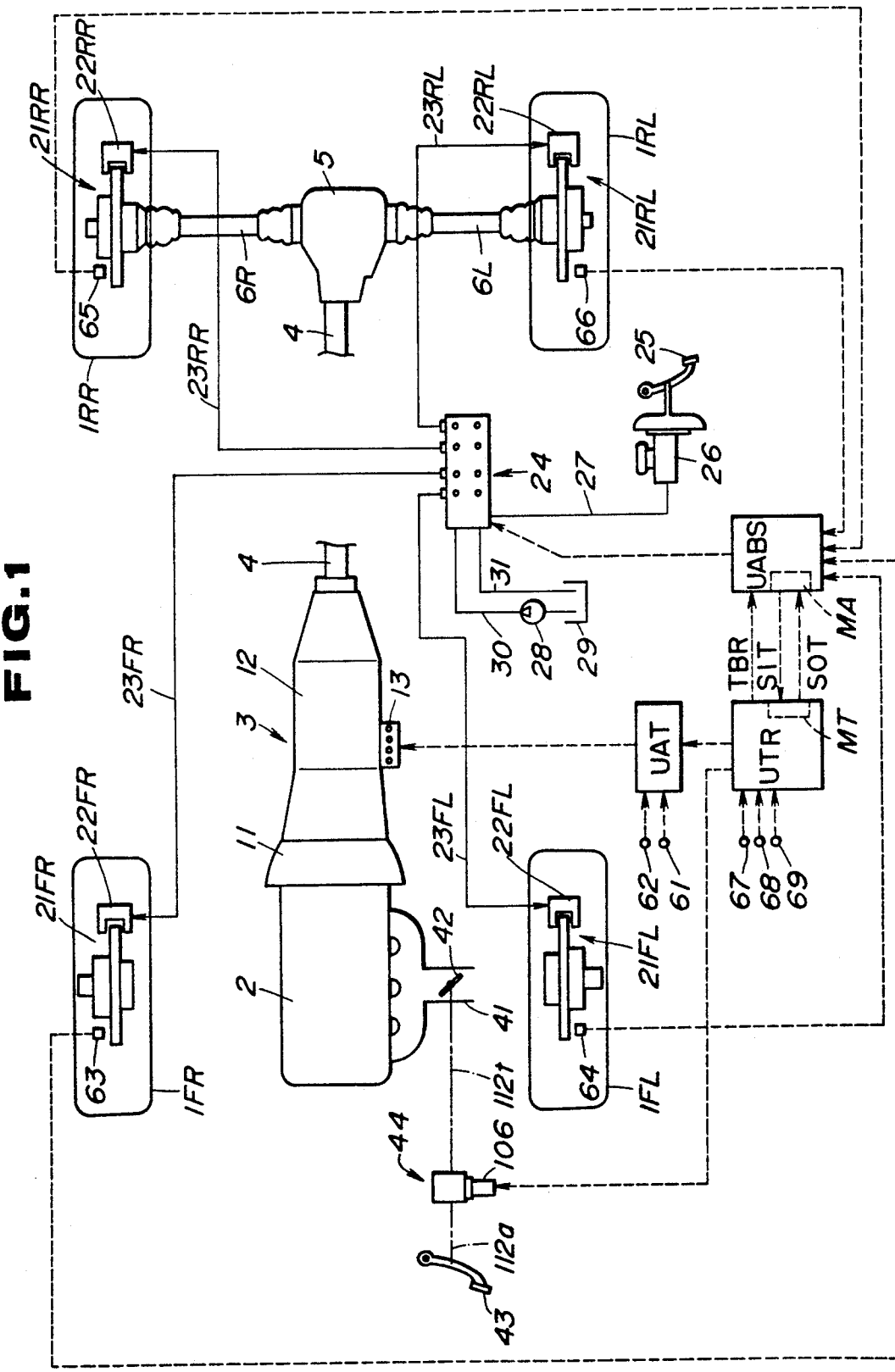
FIG. 1 is a diagrammatical representation of a slip control system according to an example of the present invention.

As shown in FIG. 1, an automobile A is shown to be of a rear wheel drive system and has a left-hand front wheel 1FL and a right-hand front wheel 1FR as undriven wheels, and a left-hand rear wheel 1RL and a right-hand rear wheel 1RR as driven wheels. An engine 2 loaded on a front portion of the vehicle body generates torque that is then transmitted through an automatic transmission 3, a propeller shaft 4 and a differential gear 5 to a left-hand drive shaft 6L and then to the left-hand rear wheel 1RL, on the one hand, and to a right-hand drive shaft 6R and then to the right-hand rear wheel 1RR, on the other hand.

Transmission

Figure 4A:
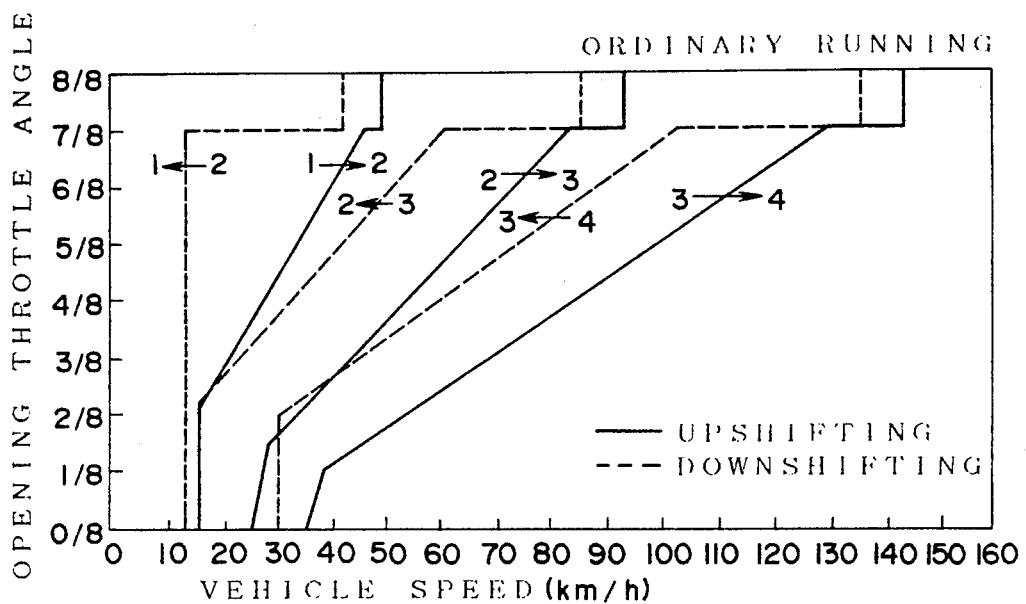
FIG. 4A is a diagram representing one example of shift characteristic for ordinary running.
Figure 4B:
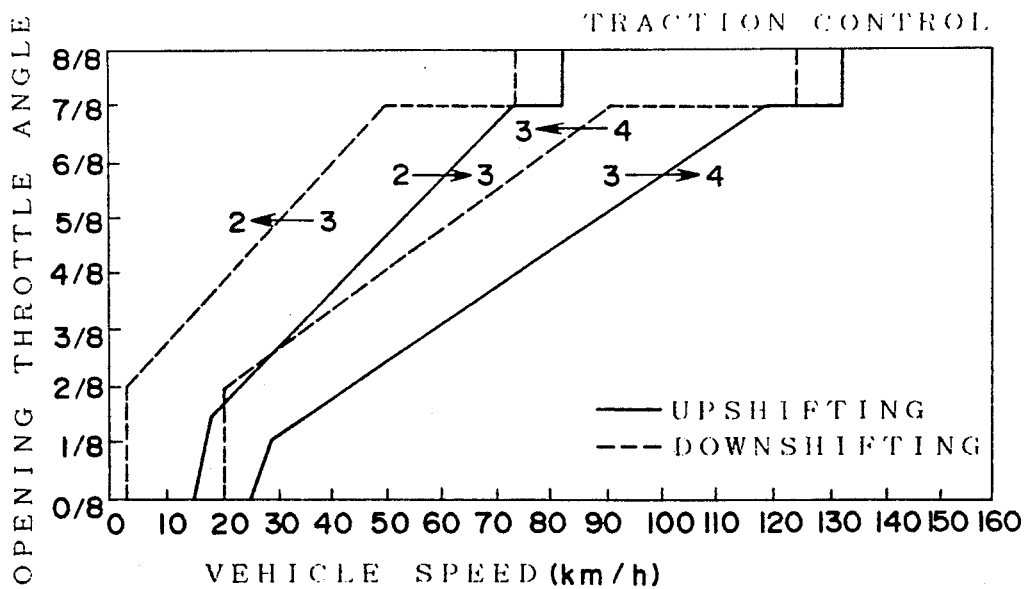
FIG. 4B is a diagram representing one example of shift characteristic for traction control.

Referring to FIG. 1, the automatic transmission 3 comprises a torque converter 11 and a multiple shift geartrain 12. The multiple shift geartrain 12 is of a hydraulically operative type as is known to the skilled in the art. In this embodiment, the geartrain has four forward speed ranges and one reverse speed range and is of the type that implements the gear shift by altering a combination of exciting and deenergizing a solenoid 13 mounted in its hydraulic pressure circuit. The solenoid 13 is controlled by a control unit UAT for shift control. The control unit UAT has pre-stored two kinds of shift characteristics as shown in FIGS. 4A and 4B and a shift, namely, upshifting and downshifting, may be performed on the basis of either of the two shift characteristics. The shift characteristic as shown in FIG. 4A is for ordinary running, namely, for non-traction control, while the shift characteristic as shown in FIG. 4B is for traction control only. More specifically, each of the shift characterisitics is set on the basis of a vehicle speed and a throttle openingangle as parameters. The shift characteristic as shown in FIG. 4B has no shift line between first and second speedstages and further offsets its all shift stages toward low-speed side as a whole, compared with the shift characteristic as shown in FIG. 4A, thus preventing the torque transmitted to the driven wheels from increasing.

On top of inputs of a signal for a throttle opening angle from a sensor 61 and a signal for a vehicle speed from a sensor 62 (in this embodiment, a signal for a number of revolutions of the propeller shaft 4), the control unit UAT receives output from a control unit UTR for traction control as will be described hereinafter. It is to be noted that the shift characteristic as shown in FIG. 4B is selected to implement shift control only when a signal representing the traction control is implemented is inputted from the control unit UTR. Otherwise, the shift control is implemented on the basis of the shift characteristics of FIG. 4A.

Adjustment of Braking Liquid Pressures

As shown in FIG. 1, the right-hand front wheel 1FR is mounted with a brake 21FR having a caliper (a wheel cylinder) 22FR which, in turn, is connected through a passage 23FR to a liquid pressure adjustment unit 24 independently from the others. Likewise, a brake 21FL mounted to the left-hand front wheel 1FL has a caliper (wheel cylinder) 22FL connected through a passage 23FL to the liquid pressure adjustment unit 24 separately from the others; a brake 21RR mounted to the right-hand rear wheel 1RR has a caliper (wheel cylinder) 22RR which, in turn, is connected through a passage 23RR to the liquid pressure adjustment unit 24; and a brake 21RL mounted to the left-hand front wheel 1RL has a caliper (wheel cylinder) 22RL connected through a passage 23RL to the liquid pressure adjustment unit 24. To the liquid pressure adjustment unit 24 is fed liquid pressure from a master cylinder 26 as a source for generating liquid pressures by stepping down a brake pedal 25 through a liquid pressure passage 27. Further, the liquid pressure adjustment unit 24 is fed through a liquid pressure passage 30 with a pressure created by the liquid pumped up by a pump 28, while it releases a liquid pressure to a reservoir tank 32 through a liquid pressure passage 31.

The liquid pressure adjustment unit 24 has two solenoid valves for each of the liquid pressure passages 23FL, 23FR, 23RL and 23RR. When the liquid pressure generated by the master cylinder 26 is transmitted to each of the brakes 21FL, 21FR, 21RL and 21RR as it is , this transmission is implemented in the same manner as an ordinary braking operation. And the braking liquid pressures to the brakes 21FL, 21FR, 21RL and 21RR can be increased or decreased separately and independently from each other. Control of increasing or decreasing the braking liquid pressures may be implemented by means of a control unit UABS for an antibrake system (ABS).

Into the ABS control unit UABS are inputted signals from sensors 63, 64, 65 and 66 for sensing speeds of revolutions of the wheels 1FL, 1FR, 1RL and 1RR, respectively. The ABS control unit UABS basically functions to reduce the braking liquid pressure to the brake or brakes of the respective wheel or wheels that is or are locked, when it is sensed that the wheel or wheels 1FL, 1FR, 1RL, 1RR are locked for anti-brake lock control, on the one hand, and to increase the braking liquid pressure thereto when the corresponding wheel or wheels is or are returned to an unlock state. During the traction control by the control unit UTR, the ABS control unit UABS further functions to conveniently supply braking liquid pressure only to the brakes 21RL and 21RR for the driven rear wheels 1RL and 1RR, respectively, in response to the signal from the control unit UTR.

Adjustment of Torque Generated by Engine

Referring to FIG. 1, the control unit UTR for traction control brakes the driven rear wheels 1RL and 1RR through the ABS control unit UABS to reduce the torque applied to the driven rear wheels 1RL and 1RR while reducing the torque to be generated by the engine. At this end, a throttle opening angle adjustment mechanism 44 is disposed in a mechanism for coupling a throttle valve 42 mounted in an air intake passage 41 for the engine with an accelerator pedal 43.

Referring now to FIG. 2, the throttle opening angle adjustment mechanism 44 is shown to comprise three levers, i.e., first lever 112, second lever 113, and third lever 114, each of which is slidable in the left-hand and right-hand directions in the drawing. The first lever 112 is connected to the accelerator pedal 43 through an accelerator wire 112a and the second lever 113 is connected to the throttle valve 42 through a throttle wire 112t. The second lever 113 is arranged to be urged by a return spring 121 in the right direction in the drawing, namely, in a direction in which the throttle valve 42 is closed.

The third lever 114 comprises a first engagement section 114a engageable with the first lever 112 from the right direction in the drawing and a second engagement section 114b engageable with the second lever 113 from the right direction in the drawing. Between the first lever 112 and the third lever 114 is mounted a first spring 116 so as to urge the first engagement section 114a of the third lever 114 in a direction in which the first engagement section 114a is brought into abutment with the first lever 112. Between the second lever 113 and the third lever 114 is mounted a second spring 122 so as to urge the second engagement section 114b thereof in a direction to allow the second engagement section 114b to come into abutment with the second lever 113. The urging force of the first spring 116 is set to be larger than the urging force of the second spring 122 and the return spring 121.

The first lever 112 is provided with an engagement section 112b in the rightward position in the drawing, thereby regulating the second lever 113 from displacing in a predetermined distance toward the rightward direction relative to the first lever 112.

A press lever 111 is disposed on the leftward side of the third lever 114 in the drawing, which is driven in the leftward and rightward directions in the drawing by means of a motor 106 and whose leftward direction beyond a predetermined distance is blocked by a stopper 123 which is arranged so as to abut with the press lever 111.

The action of the throttle opening angle adjustment mechanism 44 will now be described hereinafter.

Figure 2A:
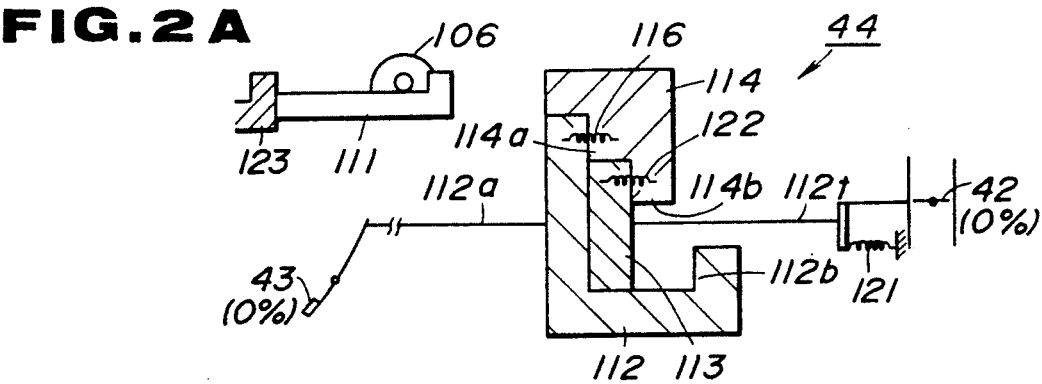
FIGS. 2(a) to 2(d) are sectional views showing states of operation of a throttle opening angle adjusting mechanism.
Figure 2B:
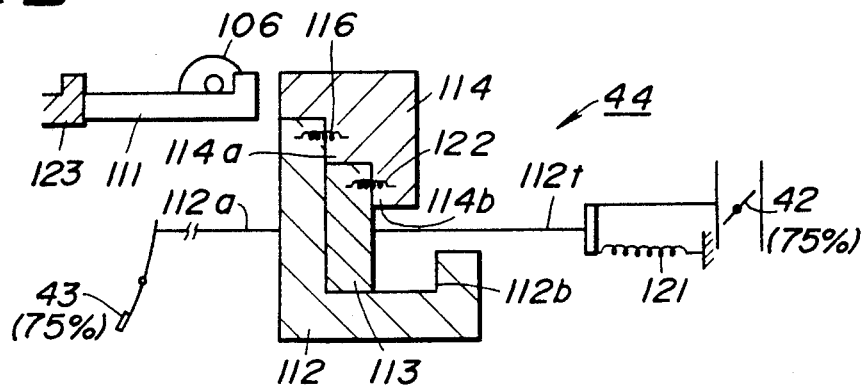

First, when the press lever 111 is in abutment with the stopper 123, no exterior force is applied to the third lever 114 so that the first lever 112 is in such a state that the first lever 112 is always integrally with the second lever 113 and the third lever 114, as shown in FIGS. 2(a) and 2(b), thus providing a throttle opening angle in accordance with an accelerator opening angle. In other words, the throttle valve is opened at opening angles ranging from 0% to 100% as the accelerator opening angle ranges from 0% to 100%. FIG. 2(a) represents the throttle opening angle of 0% while the accelerator opening angle is 0%. FIG. 2(b) represents the throttle opening angle of 75% in accordance of a 75% accelerator opening angle. As shown in FIGS. 2(a) and 2(b), there is provided a clearance between the press lever 111 and the third lever 114, a clearance being set so as to vary from 0% to 100% with respect to the full length of the clearance in accordance with the corresponding accelerator opening angle varying from 0% to 100%. In other words, for example, when the throttle opening angle is 75%, as shown in FIG. 2(b), the clearance accordingly is shortened by 75%—in other words, there is still remained a clearance accounting for 75% to 100% with the full length therebetween. This can be said of whichever opening angle is. Further, it is to be noted that, when the throttle opening angle reaches 100%, namely, when the accelerator opening angle reaches 100%, there is no clearance between the press lever 111 and the third lever 114—in other words, the press lever 111 being in slight abutment with the third lever 114.

Figure 2C:
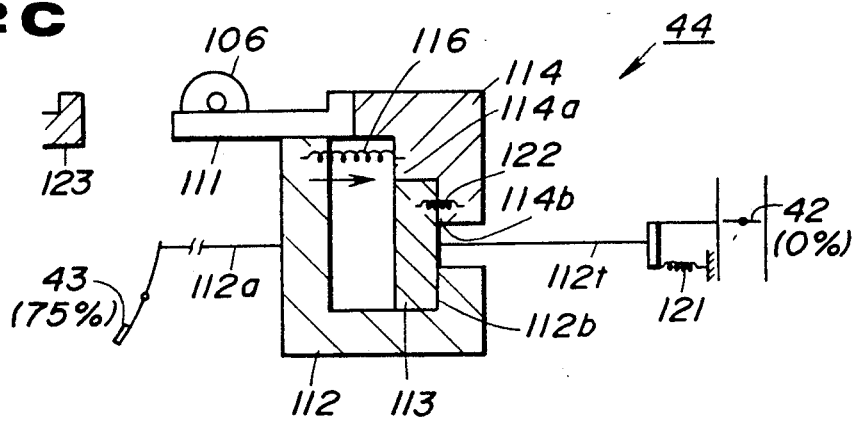

When the motor 106 is then operated to drive the press lever 111 from the state as shown in FIG. 2(b) toward the right in the drawing through the position in which the press lever 111 is brought into slight abutment with the third lever 114 to the position in which the press lever 111 is further driven toward the right in the drawing to force the third lever 114 to move toward the right, too, in resistance to the first spring 116, as shown in FIG. 2(c). This operation allows the throttle opening angle to be returned to the direction of closure even if the accelerator opening angle is the same as previously. FIG. 2(c) represents the state in which the throttle opening angle is returned to a full closed state when the accelerator opening angle is 75%. In this case, the engagement section 112b is brought into abutment with the second lever 113.

Figure 2D:
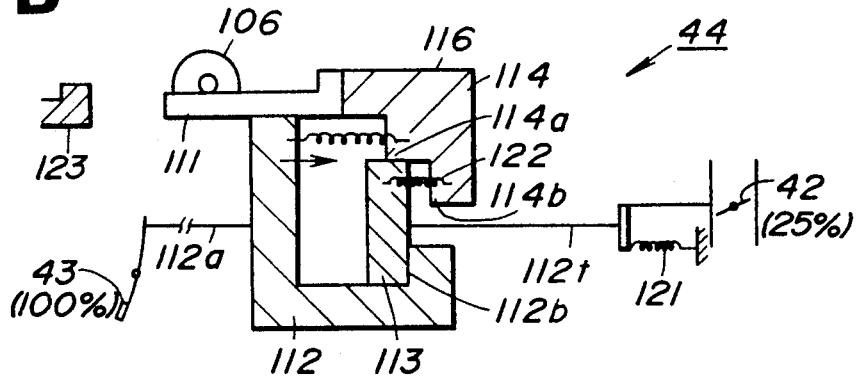

When the accelerator opening angle is forced to account for 100% as shown in FIG. 2(d) from the state as shown in FIG. 2(c), then the first lever 112 is forced to move toward the left in the drawing while the engagement section 112b forces to move the second lever 113 toward the left, too, in accompany with the leftward movement of the first lever 112. This changes the state as shown in FIG. 2(c) in which the throttle opening angle is 0% to the state as shown in FIG. 2(d) in which the throttle opening angle is 25%.

In this embodiment, the full opening operation of the accelerator pedal can allow the throttle valve 42 to be opened to the angle accounting for at least 25%. Thus, even if the press lever 111 would have been stuck in the state as shown in FIG. 2(c), the automobile could be driven by itself at the least to a tune-up factory or any other appropriate locations nearby.

Outline of Traction Control

The control unit UTR for traction control implements brake control via the ABS control unit UABS, engine control to be implemented by controlling the motor 106 for the throttle opening angle adjustment mechanism 44, and shift control via the control unit UAT for shift control. The traction control unit UTR is provided with inputs of signals through the ABS control unit UABS from the sensors 63, 64, 65 and 66 or sensing each of the wheel speeds, a signal of the throttle opening angle from the sensor 67, a signal of the accelerator opening angle from the sensor 68, and a signal of an opening angle of the motor 106 from the sensor 69.

Figure 3:
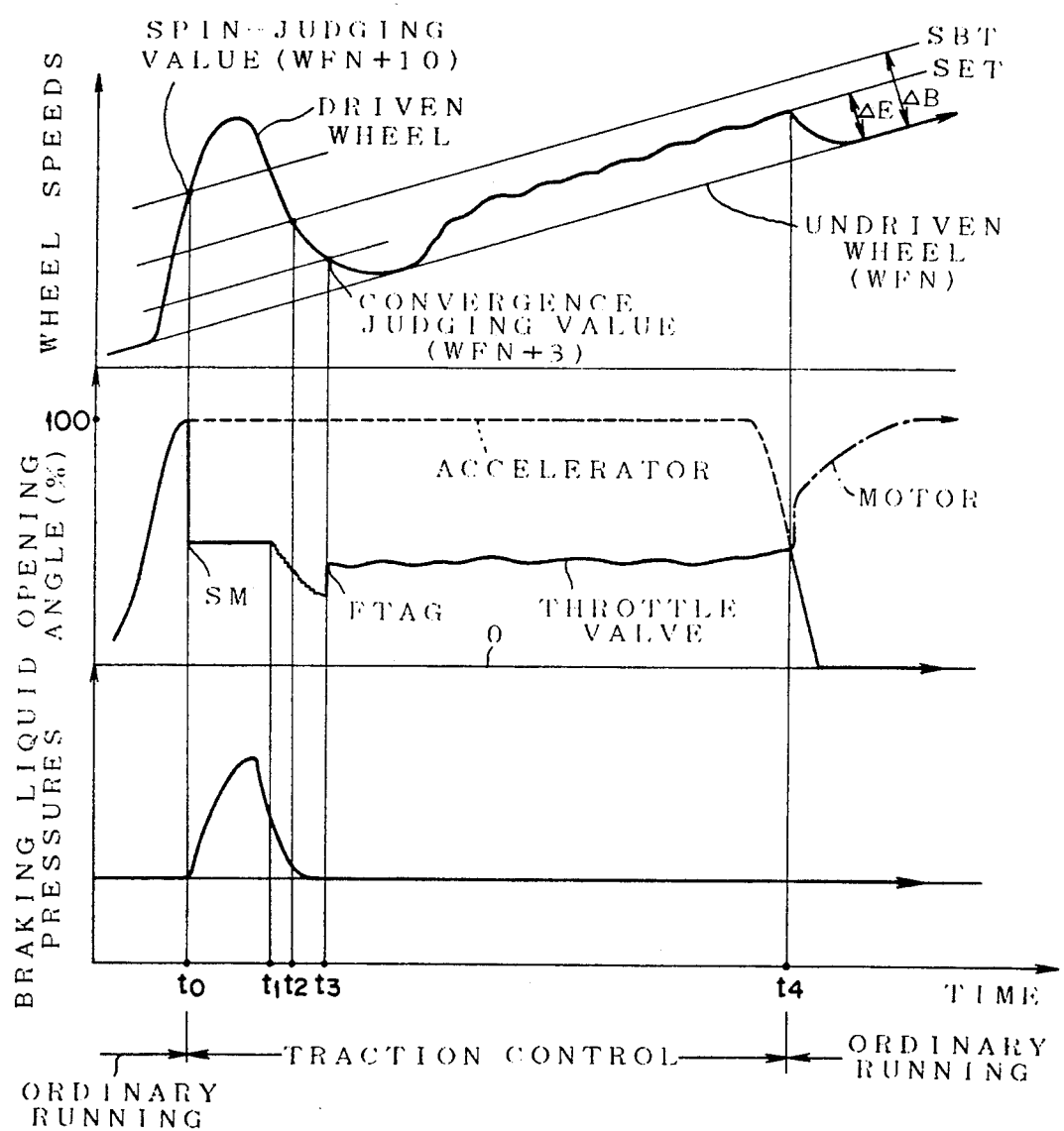
FIG. 3 is a diagram showing contents of traction control.

FIG. 3 indicates contents of the traction control with a focus on the engine control and the brake control. In FIG. 3, a undriven-wheel speed (sometimes referred to as a vehicle speed by an arithmetic mean value of speeds of the revolutions of the left-hand and left-hand front wheels) is indicated by WFN, a spin-judging value as a first judgment value by WFN+10, a spin convergence-judging value as a second judgment value by WFN+3, a target slip value for the engine by SET (WFN+$\Delta$E), and a target slip value for the brake by SBT (WFN+$\Delta$B). In FIG. 3, the opening angle of the motor 106 is such that the position indicated in FIG. 2(a) corresponds to the motor opening angle of 100% and the position indicated in FIG. 2(c) corresponds to the motor opening angle of 0%.

The spin-judging value as the first judgment value is set to be the largest, the target slip value for the brake is set to be next largest, and the target slip value for the engine is smaller than the target slip value for the brake. The spin convergence-judging value as the second judgment value is set to be the smallest.

Given the foregoing, the accelerator is full open at the time t0, namely, both the throttle opening angle and the motor opening angle are 100%. At this time, the slip value of the driven wheels exceeds the spin-judging value (WFN+10) so that the throttle opening angle (motor opening angle) is reduced immediately to point SM in order to converge the large slip of the driven wheel while the braking liquid pressure starts increasing. At the time t1 which elapsed from the time t0 by a predetermined time period (for example, 0.5 seconds), the slip value of the driven wheel is still larger than the convergence-judging value (WFN+3) so that the throttle opening angle is further reduced gradually. While the throttle opening angle has gradually been reduced, the slip value of the driven wheels is reduced below the target slip value SBT for the brake at the time t2, so that the braking liquied pressure is reduced to almost zero. At the time t3, the slip value of the driven wheels reaches the convergence-judging value (WFN+3). At the time t3, the throttle opening angle is increased immediately to the recovery opening angle FTAG in order to avoid a deceleration feeling caused by a reduction in torque to be applied to the driven wheel (this operation will also be referred to as a fourth control means). During a time period to time t4 thereafter, a feedback control is implemented so as to cause the slip value of the driven wheel to be reduced to the target slip value SET for the engine. During the feedback control, the accelerator opening angle is reduced to a great extent so as to coincide with the throttle opening angle and the motor opening angle at the time t4. Thereafter, the accelerator opening angle is further reduced to a full closed state and, at the same time, the throttle opening angle is reduced to zero in accompany with a decrease in the accelerator opening angle. On the other hand, the motor opening angle is increased to a full open state. In this state, the press lever 111 is brought into abutment with the stopper 123.

Detail of Traction Control

Detail of the traction control will be described hereinafter with reference to the flow charts of FIGS. 8 to 17.

Figure 8:
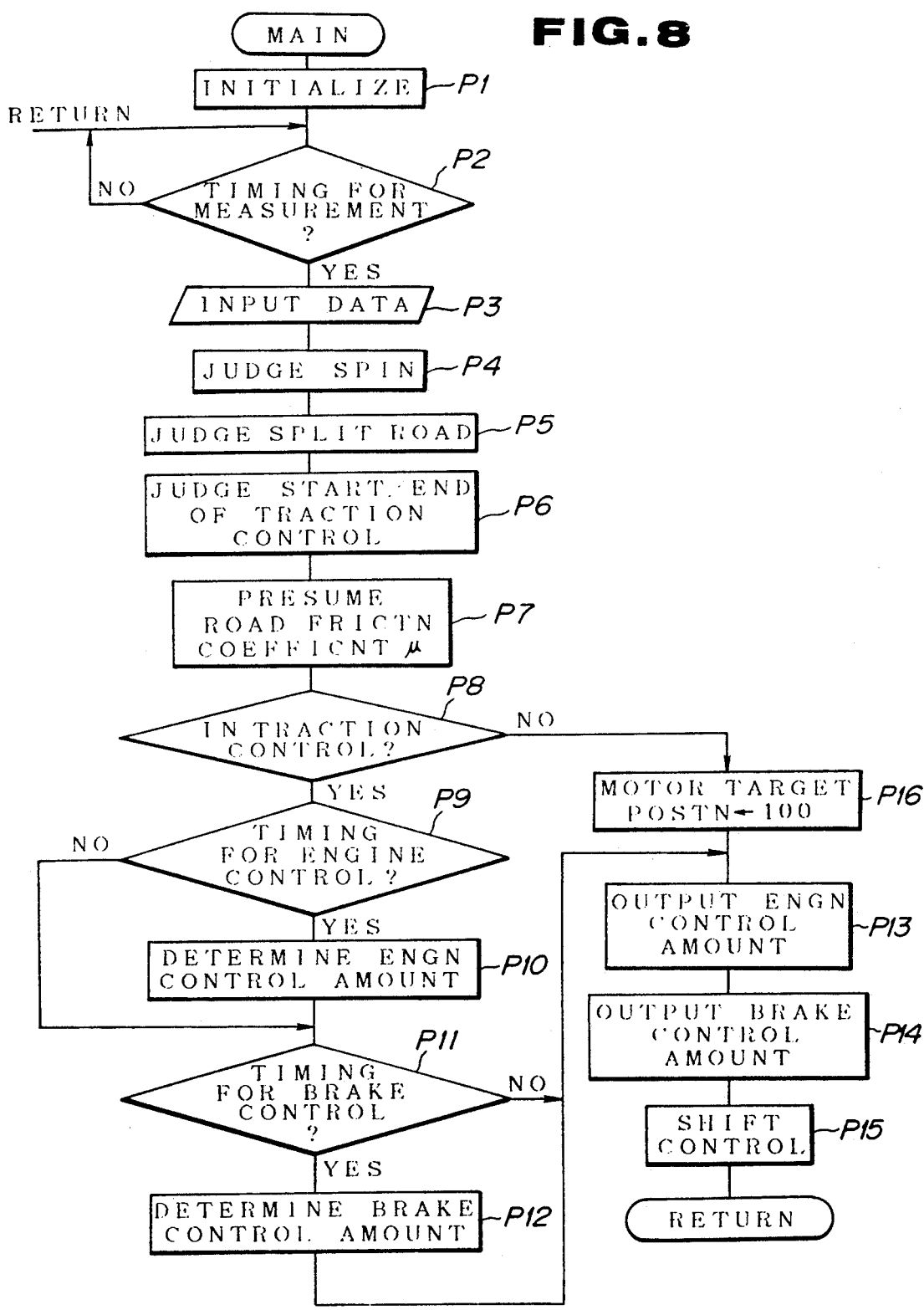

Main Routine (FIG. 8)

After initialization of the system at step P1, it is judged at step P2 whether it is a timing for predetermined measurements. When the timing was confirmed, then data are inputted from the sensors 62 to 69, inclusive, at step P3.

Then at step P4, whether a spin has occurred is judged. This judgment is carried out to position actual spin values of the left-hand driven wheel 1RL and the right-hand driven wheel 1RR with respect to the spin-judging value and the spin convergence-judging value, as shown in FIG. 3. The flow then proceeds to step P5.

At step P5, it is judged whether the road on which the vehicle is currently running has a split road surface. In other words, it is judged whether the vehicle is currently running on the split road surface which differs to a great extent between a friction coefficient $\mu$ of the road surface with which the left-hand driven wheel 1RL is in contact and a friction coefficient of the road surface with which the right-hand driven wheel 1RR is in contact.

Thereafter, at step P6, it is judged whether the traction control should be started or ended.

At step P7, there is specified the friction coefficient $\mu$ of the road surface on which the vehicle is currently running.

Then the flow advances to step P8 where it is judged whether the traction control is currently proceeding. If the traction control is now in the process, then it is judged at step P9 whether it is a timing for implementing the engine control. When it is judged at step P9 that it is the timing for the engine control, then the flow proceeds to step P10 wherein where an engine control amount is determined, namely, wherein a target position of the motor 106 is determined which indicates a magnitude of the throttle opening angle. Then at step P11, it is confirmed whether it is a timing for implementing the brake control. When the timing for the brake control is confirmed, a brake control amount is determined at step P12. In other words, at step P12, there is determined the magnitude of the braking force to be applied to the left-hand driven rear wheel 1RL or the right-hand driven rear wheel 1RR. The control amounts determined at steps P10 and P12 are then outputted at step P13 and step P14, respectively.

When it is decided at step P8 that the traction control is not currently in the process, the flow proceeds to step P16 where the target position of the motor is set to 100%, namely, where the mechanism 44 is brought into the state as shown in FIG. 2(a). Then the flow advances to step P13 where the engine control amount is generated.

At step P9, when it is confirmed that it is not the timing for controlling the engine, the flow proceeds to step P11 without passage through step P10.

After step P14, shift control is implemented at step P15. More specifically, the control unit UAT for the shift control is provided with instruction signals as to whether the shift characteristic for ordinary running as shown in FIG. 4A should be selected or whether the shift characteristic for the traction control as shown in FIG. 4B should be selected.

Figure 9:
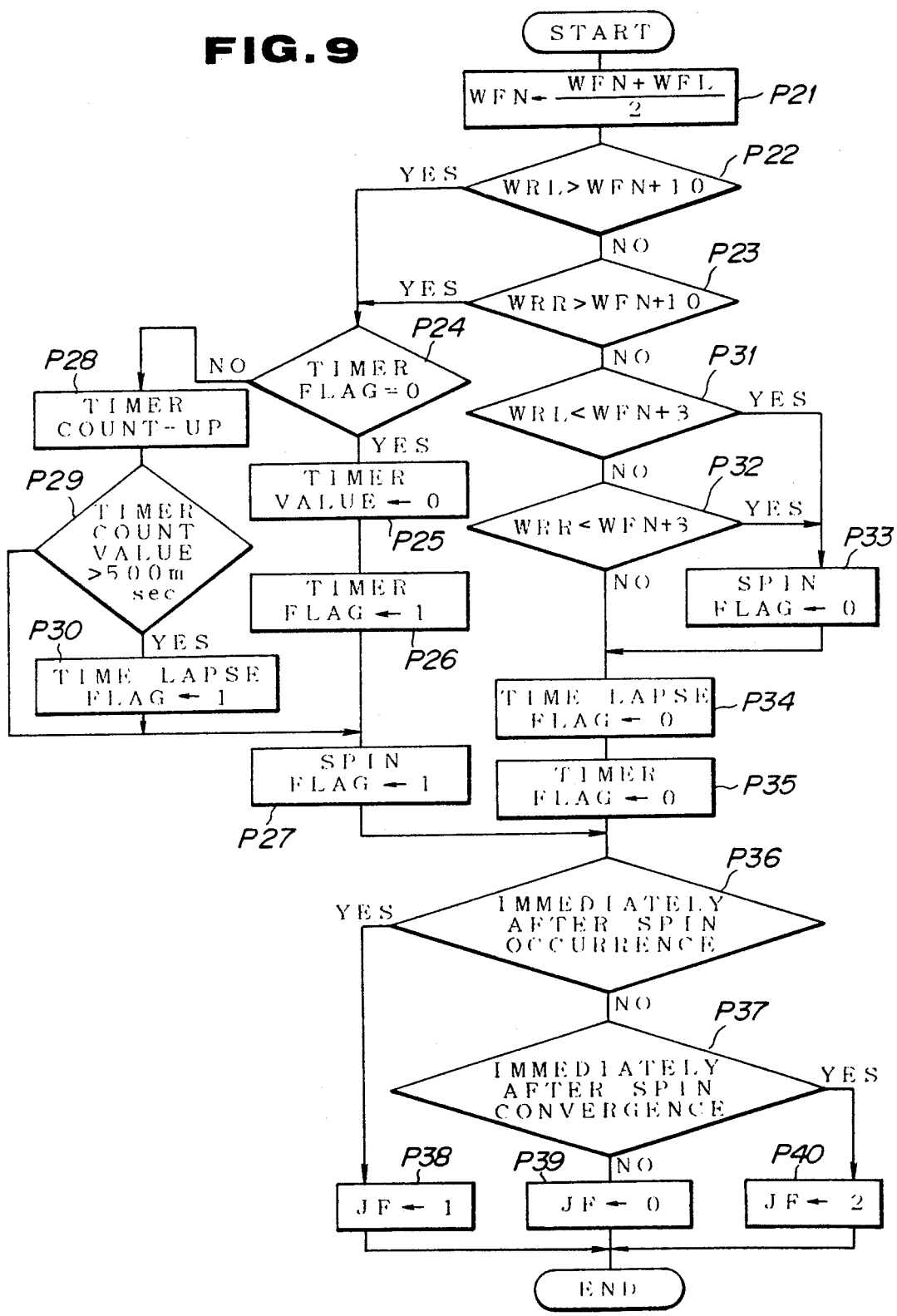

FIG. 9 (Step P4 of FIG. 8)

At step P21, an undriven-wheel speed (vehicle speed) WFN for the traction control is set by an arithmetic mean value of the speed of revolutions of the left-hand driven wheel, WFL, and the speed of revolutions of the right-hand driven wheels, WFR. i.e., $$WFN = \frac{WFR + WFL}{2}$$

After step P21, it is judged at steps P22 and P23, respectively, whether the speed of revolutions of the left-hand driven wheel, WFL, and the speed of revolutions of the right-hand driven wheels, WFR, are larger than the spin-judging value (corresponding to WFN+10 km/hour). When it is judged that either of the speeds of revolutions WFL or WFR is larger than the spin-judging value at step P22 or P23, then the flow proceeds to step P24 where it is judged whether a time flag is zero. If the time flag is zero, the timer value is reset to zero at step P25 and the timer flag is set to 1 at step P26. Further, at step P27, a spin flag is set to 1 in order to indicate that a slip has occurred which is larger than the spin-judging value (WFN+10). The processing at steps P24, P25, and P26 is executed for pre-processing to count a setting time from the time when the slip value of the driven wheel has reached the spin-judging value (WFN+10).

When it is confirmed at step P24 that the timer flag is not zero, then the flow proceeds to step P28 where the timer is counted up. Then at step P29, it is judged whether a timer count value is larger than 500 msec. When it is judged as NO, then the flow proceeds to step P27 as it is, on the one hand. When it is judged at step P29 that the timer count value is larger than 500 msec, a time lapse flag is set to 1 at step P30 in order to indicate that a predetermined time period (for example, 500 msec) has elapsed from the time t0 as shown in FIG. 3. Then the flow proceeds to step P27.

When it is judged NO at both of steps P22 and P23, then the flow proceeds to step P31 and it is judged whether the speed of revolutions of the left-hand driven wheel 1RL, WFL, is smaller than the spin convergence-judging value (corresponding to WFN+3 km/hour). If YES, then at step P33, the spin flag is reset to zero. If NO at step P31, then the flow advances to step P32, it is further judged whether the speed of revolutions of the right-hand driven wheel 1RR, WFR, is smaller than the spin convergence-judging value (corresponding to WFN+3 km/hour). If YES, the spin flag is reset to zero at step P33.

When it is judged NO at step P32 or after the resetting to zero at step P33, the time lapse flag is reset to zero at step P34 and the timer flag is reset to zero at step P35.

After step P35 or step P27, it is judged at step P36 whether it is the time that is immediately after the spin has occurred, in other words, immediately after the time t0 as shown in FIG. 3 has elapsed. When the decision at step P36 is YES, flag JF is set to 1 at step P38. If the decision at step P36 is NO, then it is judged at step P37 whether it is immediately after the spin has been converged, namely, after it is just after the time t3 as shown in FIG. 3. If YES, then flag JF is set to 2 at step P40. If NO in the decision at step P37, flag JF is reset to zero.

Figure 10:
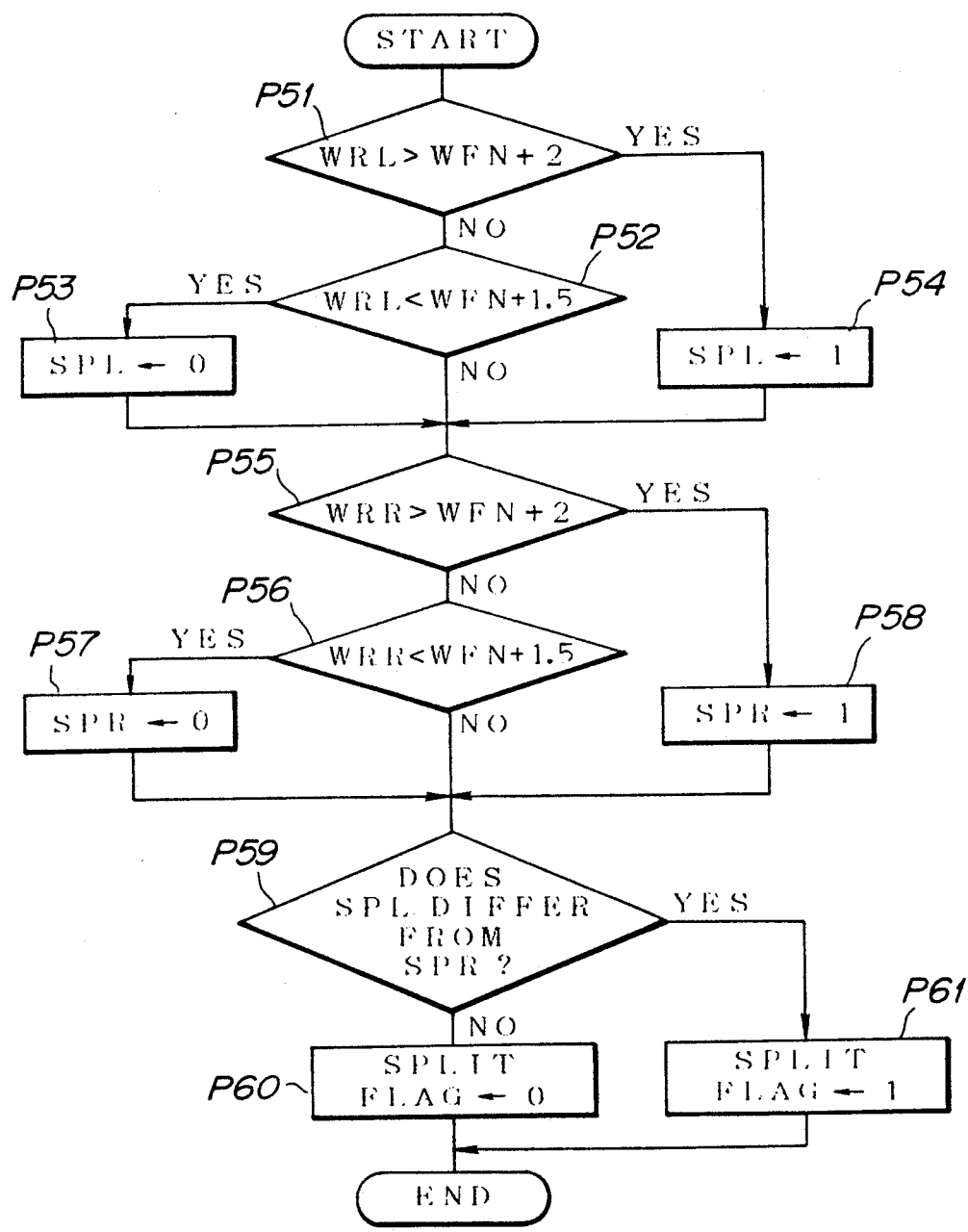

FIG. 10 (Step P5 of FIG. 8)

First, it is judged at step P51 whether the speed of revolutions of the left-hand driven wheel, WRL, is larger than WFN+2. When the decision at step P51 is NO, it is further judged at step P52 whether the revolution speed of the left-hand driven wheel, WRL, is larger than WFN+1.5. If YES at step P52, then the flow advances to step P53 and flag SPL for the left-hand driven wheel is reset to 0. If YES in the decision at step P51, then flag SPL for the left-hand driven wheel is set to 1 at step P54.

Likewise, for the right-hand driven wheel 1RR, it is judged at steps P55 and P56, respectively, whether its speed of revolutions of the right-hand driven wheel, WRR, is larger than WFN+2 and smaller than WFN+1.5, and flag SPR is set or reset at steps P57 and P58 in the same manner as for the left-hand driven wheel 1RL.

Then at step P59, it is judged whether the flag SPL differs from the flag SPR, in other words, whether one of them is set to 1 and the other is reset to 0. When it is judged at step P59 that the flag SPL differs from the flag SPR, it is decided that the road on which the vehicle is currently running is a split road surface so that split flag is set to 1 at step P61. When it is judged at step 59 that the flag SPL is the same as the flag SPR, in other words, when the flag SPL and the flag SPR are both 1 or 0, it is decided that the vehicle is currently on a non-split road so that split flag is reset to zero at step P60.

Figure 11:
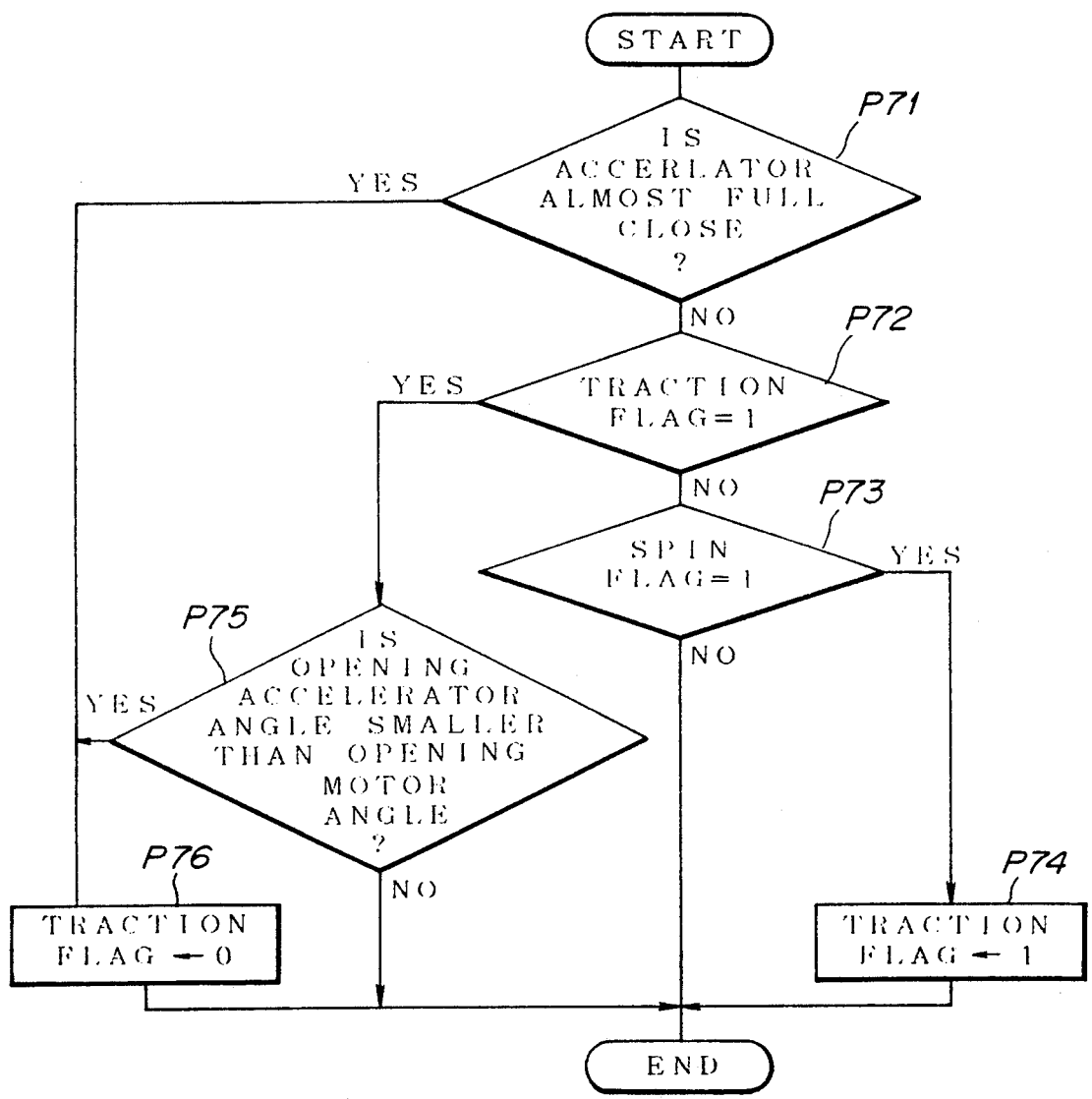

FIG. 11 (Step P6 of FIG. 8)

At step P71, it is judged whether the accelerator opening angle is substantially full closed (for example, smaller than 5%). If YES, it is decided that no traction control is required so that traction flag is reset to zero at step P76.

When it is judged at step P71 that the accelerator opening angle is not almost full closed, it is then judged at step P72 whether the traction flag is set to 1. If YES, namely, if it is decided that the traction control is in the process, then the flow proceeds to step P75 and it is judged whether the accelerator opening angle (which is the same as the throttle opening angle to be determined by the accelerator opening angle) is smaller than a current motor opening angle (which is the same as the throttle opening angle to be determined by the position of the motor 106). If YES, the flow proceeds to step P76 and the traction control is suspended by resetting the traction flag to zero. If NO at step P75, then control is ended as it is.

When it is decided at step P72 that the traction control is not currently active, it is then judged at step P73 whether the spin flag is set to 1 (see steps P27 and P33 in FIG. 9). When the decision at step P73 is in the affirmative, the traction flag is set to 1 at step P74 in order to execute the traction control. If NO at step P73, the control ends as it is.

As have been described hereinabove, in this embodiment, the condition of starting the traction control is set to be an occurrence of the slip that is larger than the spin-judging value (WFN+10), on the one hand, and the condition of suspending the traction control is set to be a substantially full closure of the accelerator opening angle or a decrease of the accelerator opening angle to such a small level that no traction control is required (by the judgment at step P75).

Figure 12:
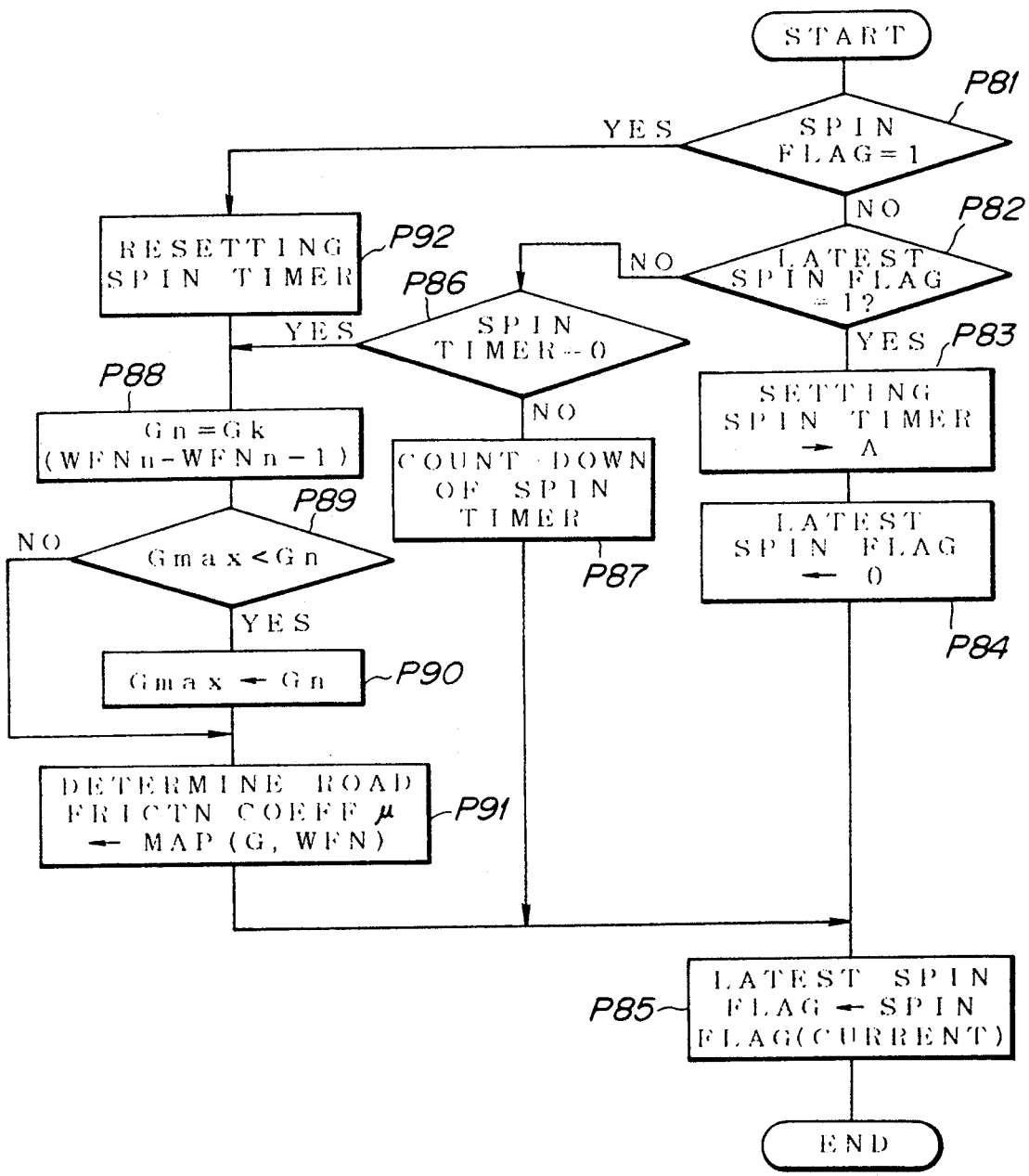

FIG. 12 (Step P7 of FIG. 8)

In FIG. 12, assumption of the road friction coefficient $\mu$ is determined on the basis of acceleration G of the vehicle body and the vehicle speed. It is further noted that no detection of the vehicle body acceleration is made for a while after the time t3 of FIG. 3 because the torque applied to the driven wheels is reduced to a significantly large extent and no sufficient degree of the acceleration can be obtained during that period. This prevents the acceleration from reflecting upon FTAG (FIG. 3) for a while after the time t3 and avoids the situation in which an acceleration feeling is impaired.

Given the foregoing, it is judged at step P81 whether the spin flag is set to 1. If YES in the decision at step P81, the spin timer is reset to zero at step P92 and the acceleration of the vehicle body, Gn, is calculated by subtracting the latest vehicle speed (one control cycle ago), WFNn−1, from the current vehicle speed, WFNn, and then multiplying the difference by a predetermined correction coefficient, Gk. Thereafter, at step P89, it is judged whether the maximum acceleration of the vehicle body, Gmax, stored so far, is smaller than the vehicle body acceleration, Gn, calculated at step P88. If it is judged that Gmax is smaller than Gn, on the one hand, then the flow proceeds to step P90 and the current vehicle body acceleration Gn is updated to a new maximum acceleration, Gmax and the flow proceeds to step P91. If it is decided at step P89 that the current vehicle body acceleration Gn is larger than the latest maximum acceleration Gmax, then the flow proceeds to step P91 as it is without passage through step P90.

Figure 5:
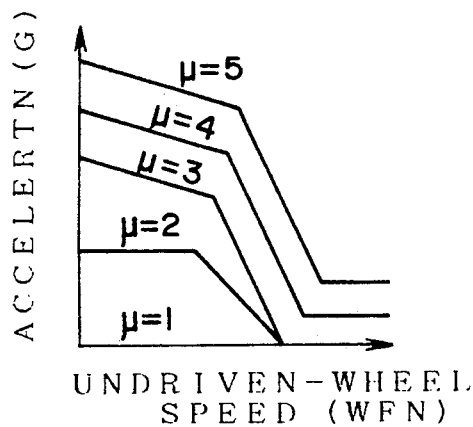
FIGS. 5-7 are maps for control to be used in accordance with the present invention.

At step P91, the road friction coefficient is assumed from the map as shown in FIG. 5 on the basis of the vehicle body acceleration Gmax and the current vehicle speed WFN. As shown in FIG. 5, the road friction coefficient $\mu$ is classified into five stages such that the larger the stage the larger the friction coefficient $\mu$ is. The same thing can be said of FIGS. 6 and 7 as will be described hereinafter.

After step P91, the current spin flag is changed as the latest spin flag at step P85.

At step P81, when it is decided that the spin flag is not set to 1, then the flow proceeds to step P82 and it is further judged whether the latest or previous spin flag is set to 1. If YES, the spin timer is set at step P83 to a predetermined value A (for example, 0.2 to 0.3 second) and then the latest spin flag is reset to zero at step P84. Thereafter, the process of step P85 is implemented.

When it is decided at step P82 that the previous spin flag is not set to 1, the flow proceeds to step P86 where it is judged whether the spin timer is set to zero. When the decision at step P86 is NO, the spin timer is counted down at step P87 and then the flow advances to step P85 where the same process as described hereinabove is implemented. If the decision at step P86 is YES, then the flow proceeds to step P88 and the process is repeated in the same manner as described hereinabove.

FIG. 13 (Step P10 of FIG. 8)

As shown in FIG. 13, the position of the motor 106, namely, the throttle opening angle, is determined. In this case, there are also determined the amount of torque rapidly decreased (the setting of SM) at the time t0 as shown in FIG. 3, the recovery opening angle (FTAG) at the time t3 as shown in FIG. 3, and the amount of torque to be gradually decreased when the spin value does not reach the spin convergence-judging value (WFN+3) within a predetermined time period from the time t0 as shown in FIG. 3. In this embodiment, even if a large extent of the slip would occur during the traction control, which exceeds the spin-judging value, it is provided that the torque to be applied is not decreased rapidly at the time t0 and decreased gradually after the time t2 as shown in FIG. 3, and increased temporarily at the time t3 as shown in FIG. 3.

Figure 6:
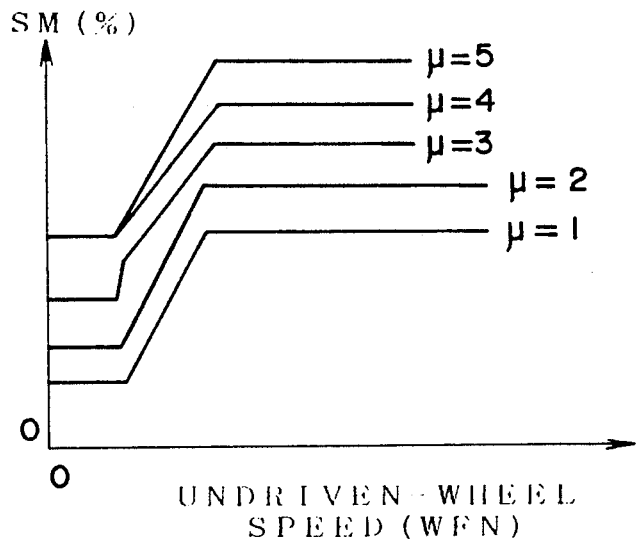
Figure 7:
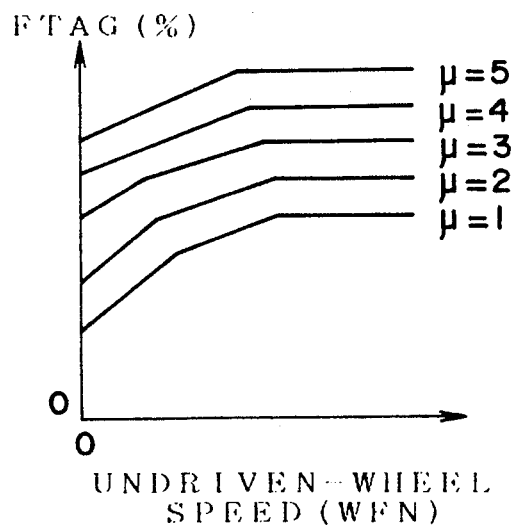

Given the foregoing, as shown in FIG. 13, at step Q1, the lower throttle limit value SM at the time t0, as shown in FIG. 3, is determined by referring the assumed friction coefficient $\mu$ and the current vehicle speed WFN to the map as shown in FIG. 6. The map as shown in FIG. 6 is set as the minimum value that is required to the least possible extent in order to maintain the current vehicle speed. Then at step Q2, recovery opening angle FTAG at the time t3 is determined by referring the assumed friction coefficient $\mu$ and the current vehicle speed WFN to the map as shown in FIG. 7.

At step Q3, it is then judged whether flag JF is currently set to 1 (steps P38 to P40 in FIG. 9). When it is decided at step Q3 that the flag JF is set to 1, the flow advances to step Q4 and it is then judged whether the spin value has reached the spin-judging value (WFN+10) for the first time, namely, whether the slip having the magnitude exceeding the spin-judging value has occured during non-traction control. If the decision at step Q4 is YES, the target position (target opening angle) of the motor 106, MTAGn, is set at step Q5 as a value corresponding to the lower limit value SM determined at step Q1. Then at step Q6, the current lower limit value SM is updated to SM1 and the flow proceeds to step Q20.

When it is decided at step Q3 that the flag JF is not set to 1, it is then judged at step Q7 whether the flag JF is set to 2. If YES, then it is further judged at step Q11 whether the spin value has been judged for the first time during the traction control. If the decision at step Q11 is in the affirmative, the target opening angle MTAGn of the motor 106 is set to the recovery opening angle FTAG (FIG. 3) and then the flow proceeds to step Q20.

When it is decided NO at step Q7, the flow proceeds to step Q8 and it is then judged whether the time lapse flag is set to zero (steps P30 and P34 in FIG. 9). It is to be noted that the decision is in the negative at step Q8 means that the slip value of the driven wheel is not decreased to a sufficient extent up to the spin convergence-judging value within the predetermined time period from the time t0 as shown in FIG. 3. At this time, the product obtained by multiplying SM1 with 0.9 and the product is updated to SM1 at step Q9. Then at step Q10, the updated SM1 is set to SM and the flow proceeds to step Q5. Transfer to step Q5 decreases gradually the throttle opening angle (the lower limit SM being decreased by 10 percents per every control cycle) during a time period when the slip value of the driven wheel is going down to the spin convergence-judging value (WFN+ 3).

When it is decided at step Q8 that the time lapse flag is set to zero, then the flow transfer to step Q13 where it is judged whether the split flag is in a 1 state (see steps P60 and P61 of FIG. 10). If the decision at step Q13 is in the negative, it means that the road on which the vehicle is currently running is not a split one. At this time, whichever larger, the speeds of revolutions of the left-hand or right-hand driven wheels, WRL or WRR, is set as a wheel speed SE to be subjected to engine control. If YES at step Q13, it means that the road on which the vehicle is running is a split road and, in this case, whichever smaller, the speeds of revolutions of the left-hand or right-hand driven wheels, WRL or WRR, is set as a wheel speed SE to be subjected to engine control. As described hereinabove, it is noted that, when the vehicle is running on a non-split road, on the one hand, the wheel speed subjected to control is selected with importance attached to stability and that, when it is running on a split road, on the other hand, the wheel speed subjected to control is selected with importance attached to acceleration. In summary, the vehicle is attempted to run with effective utilization of a grip of the driven wheel that is less likely to slip.

After step Q14 or step Q15, a slip-addition value ΔE (3<ΔE<10) is determined in accordance with the road surface friction coefficient μ at step Q16. At step Q17, a target slip value SET for the engine is then calculated by adding the slip-addition value ΔE to the current vehicle speed (undriven wheel speed) WFN (see FIG. 3).

Then at step Q18, a feedback control amount (a throttle-varying value) ΔM is determined so as to reach the current speed of revolutions of the driven wheel, SE, to the target slip value SET for the engine. The feedback control amount ΔM is calculated by the following equation (1):

$$\Delta M = KP \times (EN_n - EN_{n-1}) + KI \times EN_n \quad (1)$$

where
- KP: proportional coefficient;
- KI: integral coefficient;
- EN: SET−SE
- n: suffix Then flow proceeds to step Q19 and a target current motor position MTAGn is calculated by adding the feedback control amount ΔM to the latest target motor position MTAG$_{n-1}$. Thus, MTAGn=MTAG$_{n-1}$+ΔM.

After step Q19 or after steps Q6 or Q12, the flow is transferred to step Q20 where the target motor position MTAGn is subjected to limit processing so as to be positioned between the lower limit value SM and the upper limit value 100%.

Figure 14:
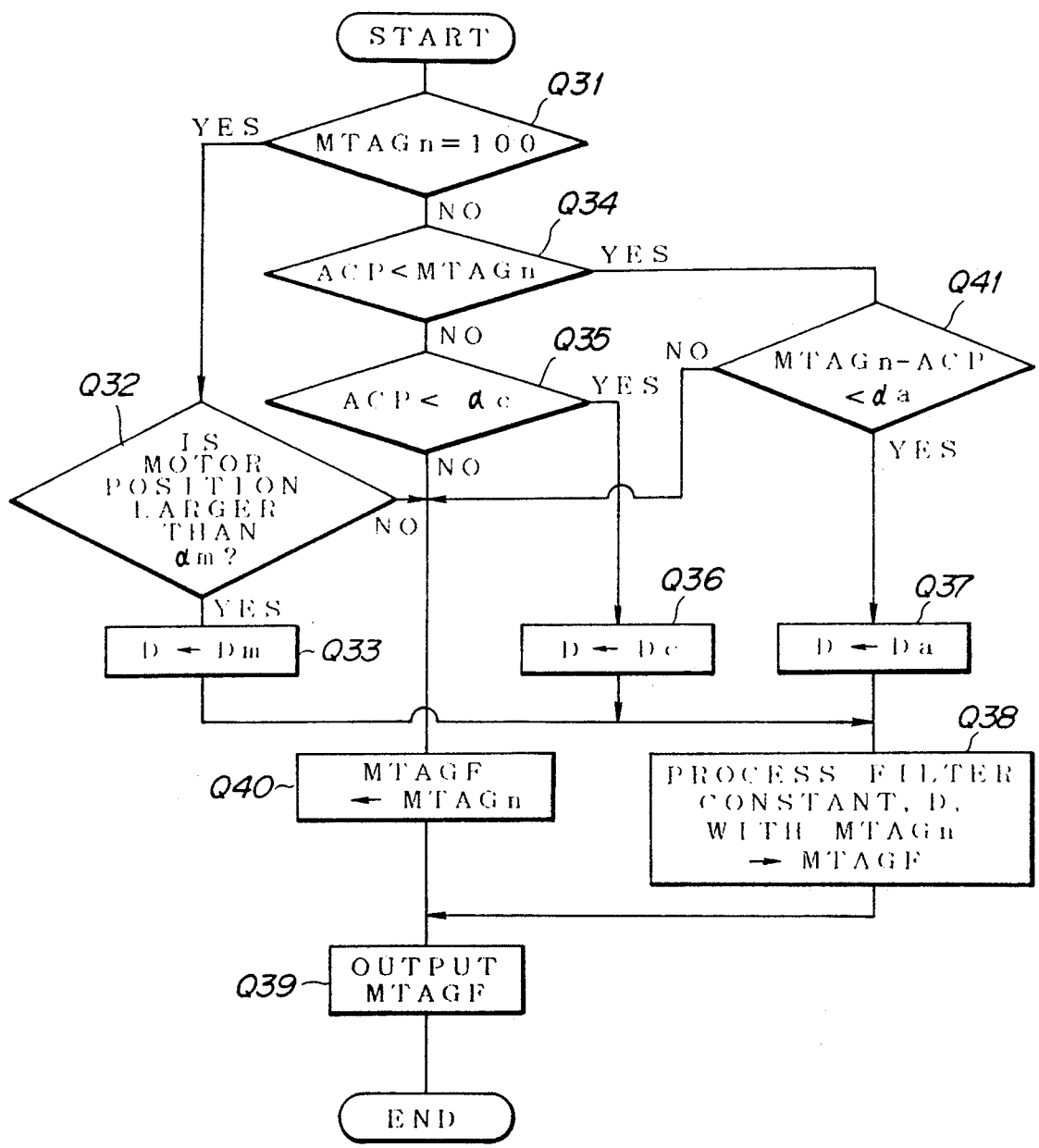

FIG. 14 (Step P13 of FIG. 8)

The flowchart as shown in FIG. 14 is to set an optimal response speed in order to allow the motor to reach a predetermined target position MTAGn and to realize (output) this target position MTAGn. The response speed is set so as to prevent occurrence of a shock to be caused due to abutment of the press lever 111 with the third lever 114 by driving the motor 106 and reduction of an acceleration feeling due to changes in urging force by the urging means 116.

First, at step Q31, it is judged whether the target motor position MTAGn accounts for 100%, in other words, whether no traction control is required. If YES, it is further judged at step Q32 whether the current position (opening angle) of the motor 106 is larger than a predetermined value αm (for example, 80%). If the decision at step Q32 is in the negative, the flow proceeds to step Q40 where the motor position MTAGn is set as a final target motor position MTAGF as it is, and the final target motor position MTAGF is generated at step Q39.

If the decision at step Q32 is in the affirmative, a filter time constant D is set as Dm at step Q33 and the flow proceeds to step Q38.

When it is decided NO at step Q31, it is then judged at step Q34 whether a current accelerator opening angle, ACP, is smaller than the target motor position MTAGn. If YES, then at step Q41, it is judged whether the difference, αa obtained by subtracting the current accelerator opening angle ACP from the target motor position MTAGn, is smaller than a predetermined value (for example, 5%). If MTAGn−ACP<αa, on the one hand, the filter time constant D is set as Da at step Q37 and then at step Q38. If MTAGn−ACP≧αa at step Q41, the flow is transferred to step Q40.

If ACP≧MTAGn at step Q34, it is further judged at step Q35 whether the current accelerator opening angle, ACP, is smaller than a predetermined value αc (for example, 5%). If ACP<αc, on the one hand, the filter time constant D is set as Dc at step Q36 and then the flow proceeds to step Q38. If ACP≧αc, on the other hand, the flow is transferred to step Q40.

At step Q38, the final target motor position MTAGF of the motor 106 is subjected to filter processing on the basis of the following equation (2), which corresponds to a variation in the motor 106 per control cycle, i.e., in the throttle opening angle).

$$MTAGF = D \times MTAGN + (1-D) \times MTAG_{n-1} \quad (2)$$

After step Q38, the final target motor position MTAGF is outputted at step Q39.

It is to be noted herein that, in this embodiment, the filter time constant is set as follows:

$$Dm < Dc < Da < 1$$

FIG. 15 (Step P12 of FIG. 8)

First, at step Q51, the slip-addition value ΔB is determined in accordance with the road surface friction coefficient μ and, at step Q52, the target slip value SBT for the brake is calculated by adding the slip-addition value ΔB to the vehicle speed (undriven-wheel speed) WFN (FIG. 3). In this embodiment, it is to be noted herein that the slip-addition value ΔB is set to be larger than the other slip-addition value ΔE, as shown in FIG. 13 (namely, SBT>SET), in order to allow traction control to be implemented as mainly as possible by the engine.

Then at step Q53, feedback control amounts TCCR and TCCL are determined by PI control so as to allow the current slip values of the right-hand and left-hand driven wheels 1RR and 1RL to reach the target slip value SBT independently from each other. The feedback control amounts TCCR and TCCL are calculated by the following equations (3) and (4), respectively:

$$TCCR = K_{BP} \times (ENR_n - ENR_{n-1}) + K_{BI} \times ENR_n \quad (3)$$

$$TCCL = K_{BP} \times (ENL_n - ENL_{n-1}) + K_{BI} \times ENL_n \quad (4)$$

where
- ENR = WRR − SBT;
- ENL = WRL − SBT;
- $K_{BP}$ = proportional constant;
- $K_{BI}$ = integral constant; and
- n = suffix At step Q54, the feedback control amounts TCCR and TCCL are then coded to integers for the outputs to the ABS control unit UABS. In other words, TCCR is coded to TCTR and TCCL is coded to TCTL. Then at step Q55, the coded integers TCTR and TCTL are subjected to limit processing in order to be contained within the range from −7 to +7.

FIG. 16 (Step P14 of FIG. 8)

First, at step Q61, the signal TBR is generated to the ABS control unit UABS, which represents whether or not brake control resulting from the traction control should be required. When TBR=0, on the one hand, this means that the brake control by the traction control is required. When TBR=1, on the other, this means that no brake control is required.

Then at step Q62, the signal SOT is generated to the ABS control unit UABS. The SOT signals represent an increase or decrease in braking liquid pressures for the left-hand and right-hand driven wheels 1RL and 1RR and contain signals TCTR and TCTL which represent magnitudes of those braking liquid pressures.

At step Q63, it is judged whether it is currently in the process of ABS control on the basis of SIT signals from the ABS control unit UABS. When the ABS control is currently in the process, ABS flag is set to 1, indicating that the ABS control is currently in the process. If it is decided at step Q63 that the ABS control is not in the process, then the flog proceeds to step Q65 where the ABS flag is reset to zero.

In usual cases, it cannot be considered that the ABS control is required concurrently with the traction control. For example, however, there may be occasions where the vehicle has jumped and the driven wheel has been fallen down violently onto the road surface during running at a high speed. At this time, the driven wheel could undergo braking action from the road surface when fallen thereonto and require the ABS control temporarily. It is to be noted herein how to take advantage of judgment results on bad roads or good roads obtained by utilizing such phenomena will be omitted herefrom.

Figure 17:
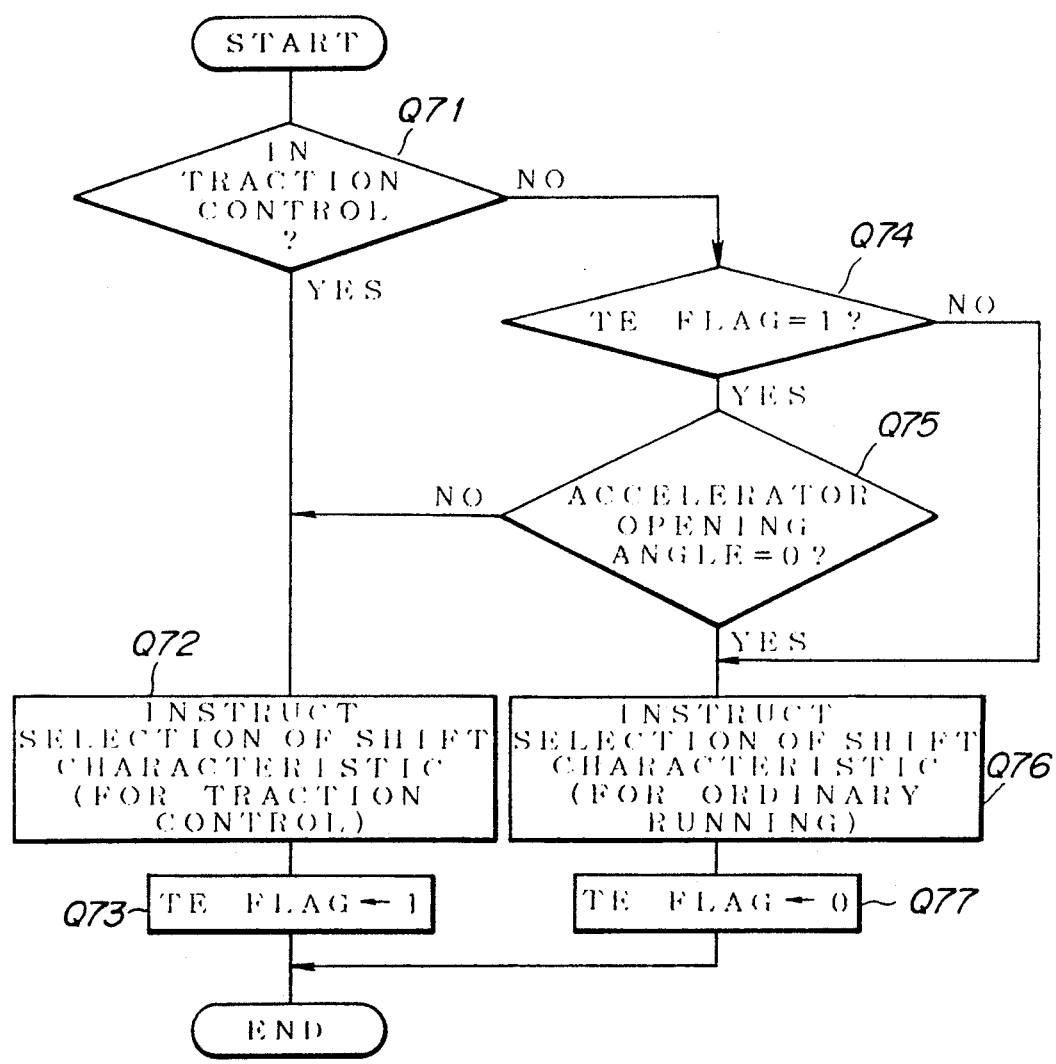

FIG. 17 (Step P15 of FIG. 8)

At step Q71, whether the traction control is being implemented is judged. When it is decided that the traction control is currently in the process, on the one hand, the control unit UAT for shift control is provided at step Q72 with a signal indicating that the shift characteristic for traction control, as shown in FIG. 4B, should be selected. Then at step Q73, flag TE is set to 1 in order to indicate that the shift characteristic for the traction control has been selected.

When it is decided at step Q71 that the traction control is not in the process, on the other hand, it is then judged whether the flag TE is set to 1 at step Q74. If NO at step P74, the control unit UAT is provided at step Q76 with an instruction indicating a selection of the shift characteristic for ordinary running as shown in FIG. 4A. Then the flag TE is reset to 0 at step Q77.

If it is decided at step Q74 that the flag TE is set to 1, it is then judged at step Q75 whether the accelerator opening angle be zero. When the decision is made that the accelerator opening angle is not zero, then the flow proceeds to step Q72 where the selection of the shift characteristic for traction control as shown in FIG. 4B is instructed. When it is decided at step Q75 that the accelerator opening angle is zero, then the flow advances to step Q76 where the shift characteristic for ordinary running, as shown in FIG. 4A, is selected.

In this embodiment, as described hereinabove, when the shift characteristic for traction control is once selected, it is returned to the shift characteristic for ordinary running (means for setting shift conditions) on condition that the accelerator is full closed. This arrangement can prevent reoccurrence of an excessive slip resulting from a change of the shift characteristics.

Relationship of Control Unit UTR with Control Unit UABS

The control unit UTR for traction control and the control unit UABS for ABS control are composed of microcomputers. The following is a brief description on the signals which are transmitted or received by the control units.

The control unit UTR generates signals indicating presence or absence of requirements for traction control as TBR signals, as described hereinabove. The 1 signal means absence of requirements for traction control while the 0 signal means presence of requirements for traction control.

The control units UTR and UABS have communication modules MT and MA, respectively, for serial transmission (FIG. 1). With these modules MT and MA, 8-bit signals are transmitted and received by means of time-division transmission.

Figure 18:
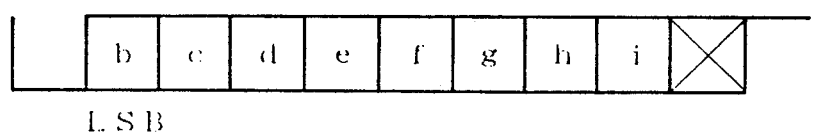
FIGS. 18 and 19 represent signals to be transmitted and received between the control unit for traction control and the control unit for ABS control, respectively.

The SOT signal to be transmitted from the control unit UTR is shown in FIG. 18. The signal SOT has 8 bits consisting of from bit b to bit i. The bits b to e are for the left-hand rear wheel 1RL, and the bits b to d indicate a control time period of the braking liquid pressure. More specifically, the time period for which the solenoid valve of the liquid pressure adjustment unit 24 is kept turned ON is represented by the integer from 0 to 7 (see step Q55 of FIG. 15). The bit e indicates distinction of an increase or a decrease in the pressure, namely, a distinction between "+" or "−". The bits f to i are for the right-hand rear wheel 1RR. The bits f to h indicate a control time period of the braking liquid pressure and the bit i indicates distinction of an increase or decrease in the pressure.

Figure 19:
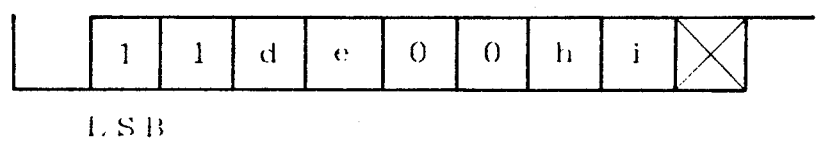

The signal SIT to be transmitted from the ABS control unit UABS is shown in FIG. 19 and consists 8 bits represented by symbols b to i. However, substantially, only four of the 8 bits, i.e., bits d, e, h and i, are used. The bit h is an echo-back for confirmation of acknowledgement of traction control data and indicates an agreement when h=0 or the signal TBR being "1" (high) and a disagreement when h=1. A reverse signal of the bit h is the bit d. The bit i indicates the state of the ABS control. The state of i=0 indicates a non-ABS control and the state of i=1 indicates the ABS control being in the process. The bit e is a reverse signal of the bit i.

In this embodiment, it is possible to allow the ABS control unit to control the braking liquid pressure with priority over the ABS control when the traction control is required while data for traction control is always sent to the ABS control unit UABS from the control unit UTR. It is also possible to permit data transfer for traction control only when the ABS control unit UABS sends a request signal (for example, a request signal being generated in synchronization with a timing for output of a signal for braking liquid adjustment during non-ABS control).

It is to be understood herein that the present invention is not restricted to those embodiments as described hereinabove, but it contains various variants and modifications within the spirit and scope of the invention.

(1) In place of a slip amount based on a deviation between a driven-wheel speed and the vehicle speed, there may be used, as the slip value, a ratio of the driven-wheel speed to the vehicle speed or a value obtained by subtracting the vehicle speed from the driven-wheel speed and then dividing the difference with the driven-wheel speed.

(2) During the traction control, it is possible to temporarily decrease torque to be applied by means of a second control means at the time t0 as shown in FIG. 3 and to gradually decrease torque to be applied by a third control means in correspondence with the temporary decrease in the torque by means of the second control means during the time period between the time t1 and t3. In this case, it may be such that, in order not to impair acceleration feeling, a first judgment value and a second judgment value are made a relatively small level during the traction control or an amount of a decrease in the torque applied is made relatively smaller.

(3) In decreasing the torque to be applied to the driven wheels, it is possible to implement the brake control mainly and the engine control secondarily (SET>SBT). The traction control may be implemented by means of either of the engine control or the brake control.

The present invention may be embodied in other specific forms without departing from the spirit and scope thereof. The present embodiments as described hereinabove are therefore to be considered in all respects as illustrative and not restrictive, the scope of the invention being indicated by the appended claims, and all the changes, modifications and variations which come within the meaning and range of equivalency of the claims are therefore intended to be encompassed within the spirit and scope of the invention.

What is claimed is:

1. A slip control system for a vehicle, comprising:
   a torque adjusting means for adjusting torque to be applied to a driven wheel;
   a slip-value detecting means for detecting a slip value of the driven wheel on a road surface;
   a first control means for subjecting the torque adjusting means to feedback control so as to allow the slip value of the driven wheel to reach a predetermined target value in response to output from the slip-value detecting means;
   a second control means for reducing the torque to be applied to the driven wheel temporarily by a predetermined decrement by controlling the torque adjusting means prior to the first control means when the slip value detected by the slip-value detecting means reaches a first judgment value set as a value greater than the predetermined target value; and
   a third control means for reducing the torque to be applied to the driven wheel gradually by controlling the torque adjusting means prior to the first control means when the slip value detected by the slip-value detecting means does not reach a second judgment value set as a value smaller than the first judgment value even if a predetermined period of time elapses after start of control by the second control means.

2. A slip control system as claimed in claim 1, wherein:
   a transmission interposed between an engine and the driven wheel of the vehicle is an automatic transmission capable of implementing a shift on the basis of a predetermined shift characteristic; and
   the predetermined shift characteristic comprises a first shift characteristic for ordinary running and a second shift characteristic for traction control;
   wherein shift control of the automatic transmission is implemented on the basis of the second shift characteristic only when control is implemented by either of the first control means, the second control means or the third control means.

3. A slip control system as claimed in claim 1, further comprising:
   an automatic transmission interposed between an engine and the driven wheel of the vehicle;
   a shift-characteristic storage means for storing the first shift characteristic for ordinary running and the second shift characteristic for traction control;
   a shift-characteristic selecting means for selecting the second shift characteristic for traction control when control is implemented by either of the first control means, the second control means or the third control means and for selecting the first shift characteristic for ordinary running when control is implemented by a control means other than the first, second and third control means; and
   a shift control means for controlling a shift of the automatic transmission on the basis of the shift characteristic selected by the shift-characteristic selecting means.

4. A slip control system as claimed in claim 3, wherein:
   the first shift characteristic for ordinary running is set so as to shift between a lowest speed stage and a highest speed stage; and
   the second shift characteristic for traction running is set so as not to shift to the lowest speed stage.

5. A slip control system as claimed in claim 3, wherein the second shift characteristic is set so as to make its shift line located on a speed side lower than the first shift characteristic.

6. A slip control system as claimed in claim 3, further comprising a switching-condition setting means for setting a condition as a switching condition when the shift-characteristic selecting means selects the first shift characteristic from a state where the second shift characteristic is selected, a condition being such that an accelerator opening angle reaches substantially zero.

7. A slip control system as claimed in claim 1, wherein the torque adjusting means is a member for adjusting torque generated by the engine, or output from the engine.

8. A slip control system as claimed in claim 1, wherein the torque adjusting means is a member for adjusting a braking force applied to the driven wheel.

9. A slip control system as claimed in claim 1, wherein:
   the torque adjusting means comprises an engine adjusting means for adjusting torque generated by the engine, or output from the engine, and a braking-force adjusting means for adjusting a braking force applied to the driven wheel; and
   the first control means controls the engine adjusting means and the braking-force adjusting means.

10. A slip control system as claimed in claim 9, wherein:
    the second control means controls the engine adjusting means only; and
    the third control means controls the engine adjusting means only.

11. A slip control system as claimed in claim 10, further comprising a fourth control means for increasing torque generated by the engine by a predetermined increment by controlling the engine adjusting means prior to the first control means when the slip value of the driven wheel is decreased to the second judgment value.

12. A slip control system as claimed in claim 9, wherein:
    the predetermined target value by the first control means comprises a first target value for the engine adjusting means and a second target value for the braking-force adjusting means;
    wherein the first target value is different in magnitude from the second target value.

13. A slip control system as claimed in claim 12, wherein the first target value is set to a value smaller than the second target value.

14. A slip control system as claimed in claim 13, wherein the second judgment value is set to a value smaller than the first target value.

15. A slip control system as claimed in claim 1, wherein control by the first control means starts after conclusion of control by the second control means.

16. A slip control system as claimed in claim 1, wherein:
the torque adjusting means contains at least a braking-force adjusting means for adjusting a braking force applied to the driven wheel; and
an ABS control means for implementing an anti-lock control for preventing a wheel from being locked with respect to the road surface by controlling the braking-force adjusting means when the braking force is applied to the wheel by manual operation; and
wherein control of the braking-force adjusting means by the first control means is implemented through the ABS control means.

17. A slip control system as claimed in claim 16, wherein the braking-force adjusting means is controlled in accordance with a signal for requiring braking prior to the anti-lock control when the signal for requiring braking is transferred from the first control means to the ABS control means.

18. A slip control system as claimed in claim 16, wherein the ABS control means controls the braking-force adjusting means on the basis of the signal for requiring braking from the first control means only when no anti-lock control is implemented.

19. A slip control system as claimed in claim 1, wherein:
control by the second control means is implemented only prior to start of control by the first control means and control by the third control means is implemented only prior to start of control by the first control means; and
wherein control by the second and third control means is inhibited during control by the first control means.

20. A slip control system as claimed in claim 1, wherein a control amount by the second control means is set on the basis of a friction coefficient $\mu$ on a road surface.

21. A slip control system as claimed in claim 11, wherein a control amount by the fourth control means is set on the basis of a friction coefficient $\mu$ on a road surface.

22. A slip control system as claimed in claim 1, wherein either of front wheels or rear wheels is driven wheels and the other is undriven wheels; and
the slip-value detecting means calculates the slip value of the driven wheel on the basis of a speed of revolutions of the undriven wheel and a speed of revolutions of the driven wheel.

* * * * *